(12) United States Patent
Kwaterski et al.

(10) Patent No.: US 11,639,212 B2
(45) Date of Patent: May 2, 2023

(54) SUSPENSION ASSEMBLY

(71) Applicant: HAYES BICYCLE GROUP INC., Mequon, WI (US)

(72) Inventors: Edward C Kwaterski, Cedarburg, WI (US); Thomas D Schmidt, Thiensville, WI (US)

(73) Assignee: HAYES BICYCLE GROUP INC., Mequon, WI (US)

( * ) Notice: Subject to any disclaimer, the term of this patent is extended or adjusted under 35 U.S.C. 154(b) by 336 days.

(21) Appl. No.: 16/843,892

(22) Filed: Apr. 9, 2020

(65) Prior Publication Data

US 2020/0324852 A1 Oct. 15, 2020

Related U.S. Application Data

(60) Provisional application No. 62/832,234, filed on Apr. 10, 2019.

(51) Int. Cl.
*B62K 25/28* (2006.01)
*F16F 9/56* (2006.01)
(Continued)

(52) U.S. Cl.
CPC ............ *B62K 25/286* (2013.01); *B62K 23/02* (2013.01); *B62K 23/06* (2013.01); *F16F 9/56* (2013.01);
(Continued)

(58) Field of Classification Search
CPC ............ B62K 25/286; B62K 2025/047; F16F 2230/0041
See application file for complete search history.

(56) References Cited

U.S. PATENT DOCUMENTS 8,807,300 B2 8/2014 Marking
8,887,881 B2 11/2014 Hsu
(Continued)

FOREIGN PATENT DOCUMENTS

WO WO-0059771 A1 * 10/2000 ............. B62K 25/04

*Primary Examiner* — Melody M Burch
(74) *Attorney, Agent, or Firm* — Zimmerman Intellectual Property Services LLC

(57) ABSTRACT

A suspension assembly for a bicycle is disclosed. The suspension assembly may be configured to use a volume of fluid in a fluid circuit for damping and may comprise a damping mechanism; the suspension assembly may comprise a lockout mechanism independent of the damping mechanism configured to prevent damping by the damping mechanism and an actuator for the lockout mechanism. The lockout setting may be independent of the damping setting. A suspension system may comprise a fluid circuit for a fluid configured to provide damping for a bicycle; the suspension system may comprise a damping mechanism configured to provide a damping setting for damping and a lockout mechanism configured to provide a lockout setting and comprising (a) a flow control element (such as an adjuster shaft) configured in the lockout setting to prevent flow of the fluid through the damping mechanism and (b) a flow control element (such as a blow-off valve) configured to allow flow to a reservoir chamber of the fluid circuit if the pressure of the fluid is greater than a threshold value; an actuator for the lockout mechanism configured to actuate the flow control element configured to prevent flow through the damping mechanism; the lockout mechanism may configured to provide the lockout setting when on and to permit damping at the damping setting by the damping mechanism when off.

20 Claims, 14 Drawing Sheets

(51) Int. Cl.
  *B62K 23/06* (2006.01)
  *B62K 23/02* (2006.01)
  *B62K 25/04* (2006.01)

(52) U.S. Cl.
  CPC ..... *B62K 2025/047* (2013.01); *F16F 2222/12* (2013.01); *F16F 2230/0041* (2013.01); *F16F 2230/186* (2013.01)

(56) References Cited

U.S. PATENT DOCUMENTS

| | | | |
|---|---|---|---|
| 2005/0178626 A1* | 8/2005 | Turner | B60G 17/002 188/322.2 |
| 2011/0042869 A1* | 2/2011 | Runkel | F16F 9/067 267/64.28 |
| 2011/0202236 A1* | 8/2011 | Galasso | B62K 25/04 701/37 |
| 2012/0187653 A1* | 7/2012 | Edgeworth | B62K 25/28 280/283 |

* cited by examiner

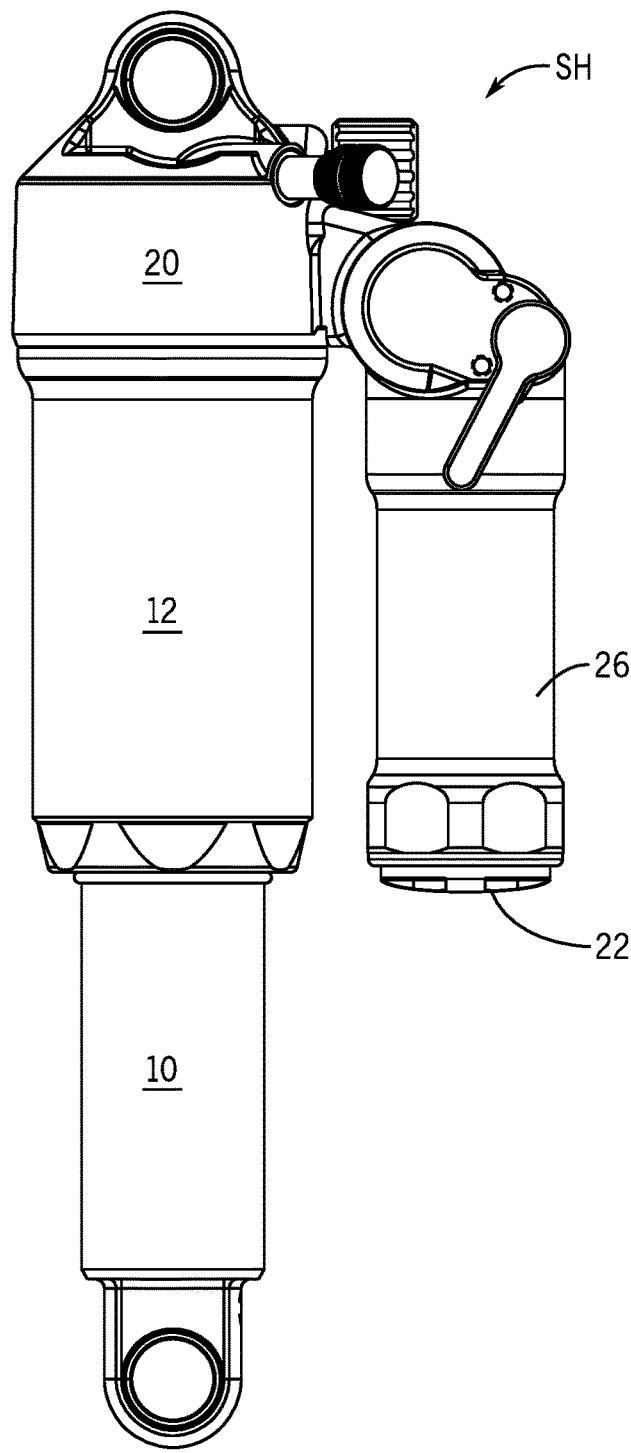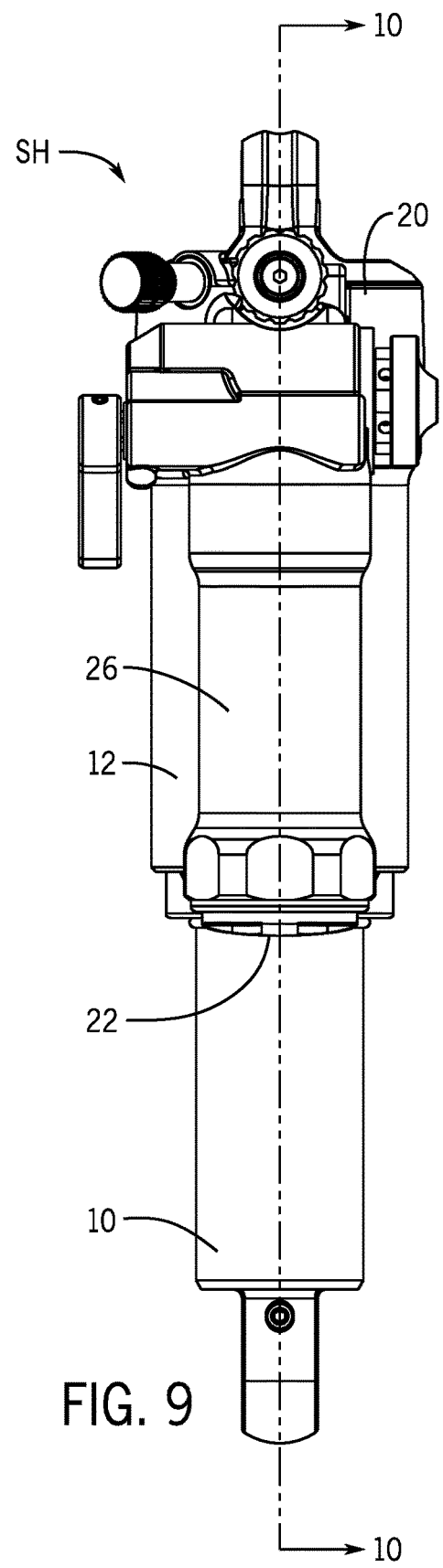
FIG. 8
FIG. 9

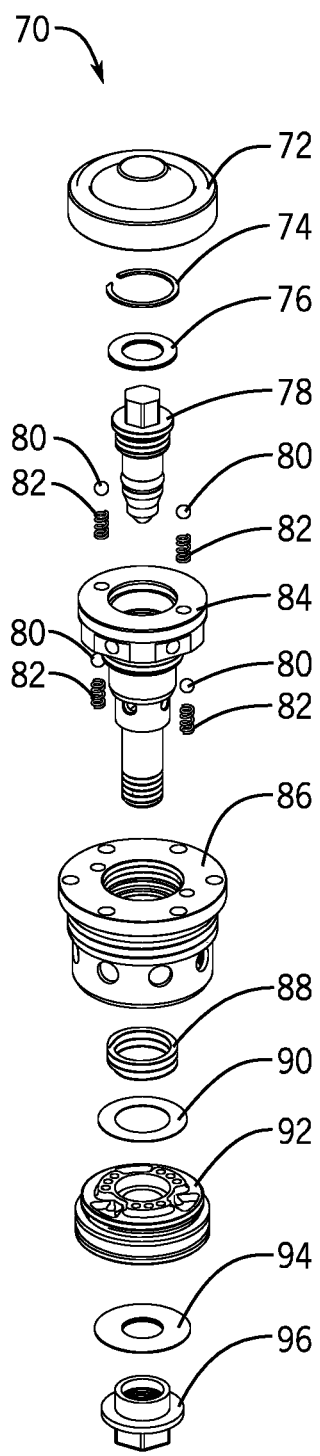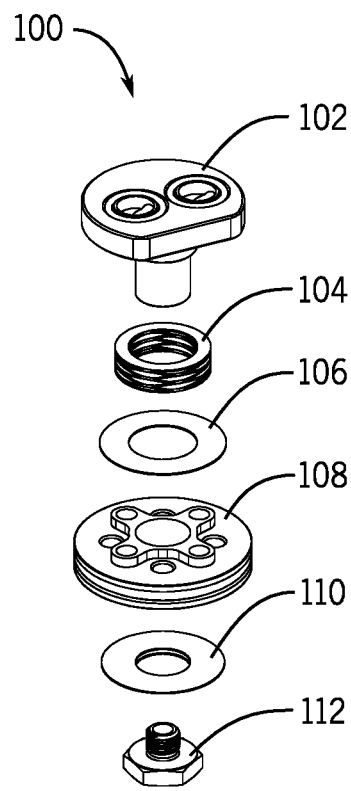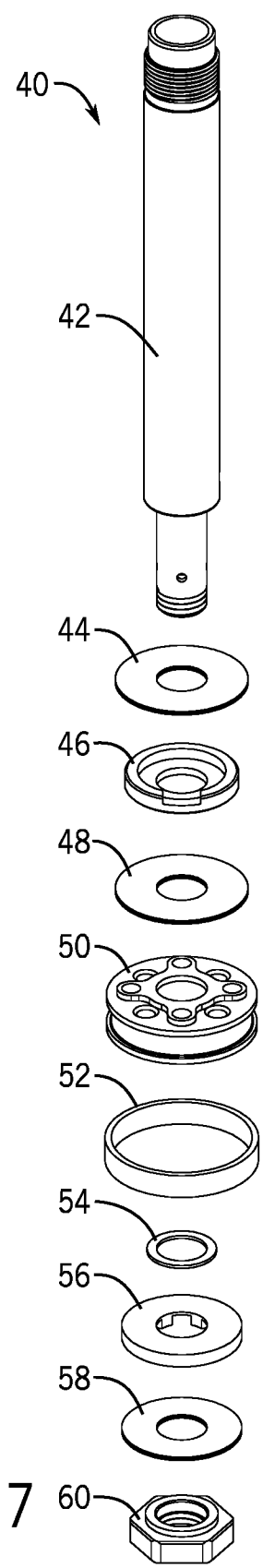

SUSPENSION ASSEMBLY

CROSS-REFERENCE TO RELATED APPLICATION(S)

The present invention claims priority to and incorporates by reference in entirety the following U.S. patent application(s): (a) U.S. Provisional Patent Application No. 62/832,234 titled "SUSPENSION ASSEMBLY," filed Apr. 10, 2019.

FIELD

The present invention relates to a suspension assembly for a bicycle.

BACKGROUND

It is known to provide a suspension system for a bicycle comprising a damping system to provide suspension damping. It is also known to provide a lockout arrangement for a suspension system to disable the damping system, for example by adjusting the settings of the damping system to lock out/"stiffen" the response. In such known arrangements, it may be necessary to adjust/reset the settings of the damping system each time the lockout arrangement is engaged or actuated, which may result in delay, inconvenience, etc.

It would be advantageous to provide an improved suspension assembly with a damping system and a lockout system/mechanism configured to be actuated between an "on" setting providing lockout and an "off" setting without lockout without requiring any adjustment of settings of the damping system.

SUMMARY

The present invention relates to a suspension assembly configured to use a volume of fluid in a fluid circuit for damping comprising a damping mechanism comprising a lockout mechanism independent of the damping mechanism configured to prevent damping by the damping mechanism and an actuator for the lockout mechanism; the lockout mechanism may be configured to provide a lockout setting and the lockout setting may be actuated by the actuator of the lockout mechanism; the damping mechanism may be configured to provide a damping setting and the lockout setting may be independent of the damping setting. The suspension assembly may comprise a shock assembly comprising the damping mechanism and the lockout mechanism; the actuator for the lockout mechanism may be on the shock assembly; the actuator may be remote from the shock assembly. The actuator may comprise at least one of a lever or a switch. The lockout mechanism may be configured to be actuated without a tool. The lockout mechanism may comprise a flow control element to prevent flow of fluid from the fluid circuit into a reservoir chamber when the lockout mechanism may be actuated. The suspension assembly may comprise a flow path for fluid through the lockout mechanism into a reservoir chamber separate from a flow path for fluid through the damping mechanism into the reservoir chamber. The lockout mechanism may be configured to be turned on and turned off without modification of the damping setting of the damping mechanism. The lockout mechanism may be configured to prevent flow of fluid into a reservoir chamber at the lockout setting; so that when the lockout mechanism is on fluid cannot enter a flow path for fluid through the damping mechanism.

The present invention relates to a suspension assembly comprising a fluid circuit for a fluid configured to provide damping for a bicycle comprising a damping mechanism configured to provide a damping setting for damping; a lockout mechanism configured to provide a lockout setting to prevent flow of the fluid through the damping mechanism; an actuator to actuate the lockout mechanism. The lockout mechanism may be configured to provide the lockout setting when on and to permit damping at the damping setting by the damping mechanism when off. The lockout mechanism may be configured to provide a lockout setting to lock out damping by the damping mechanism; the damping mechanism may be inoperative when the lockout mechanism is turned on to provide the lockout setting without damping; the damping mechanism may be operative to provide damping at the damping setting when the lockout mechanism is turned off. The suspension assembly may comprise a shock assembly comprising the damping mechanism and the lockout mechanism. The actuator for the lockout mechanism may be on the shock assembly. The actuator for the lockout mechanism may be remote from the shock assembly.

The present invention relates to a suspension system comprising a fluid circuit for a fluid configured to provide damping for a bicycle comprising a damping mechanism configured to provide a damping setting for damping; a lockout mechanism configured to provide a lockout setting and comprising (a) a flow control element configured in the lockout setting to prevent flow of the fluid through the damping mechanism and (b) a flow control element configured to allow flow to a reservoir chamber of the fluid circuit if the pressure of the fluid may be greater than a threshold value; an actuator for the lockout mechanism configured to actuate the flow control element configured to prevent flow through the damping mechanism; the lockout mechanism may be configured to provide the lockout setting when on and to permit damping at the damping setting by the damping mechanism when off. The damping mechanism may be inoperative when the lockout mechanism is turned on to provide the lockout setting without damping; the damping mechanism may be operative to provide damping at the damping setting when the lockout mechanism is turned off. The suspension system may comprise a shock assembly comprising the damping mechanism and the lockout mechanism. The lockout mechanism may be configured to be adjusted without a tool.

The present invention relates to a suspension assembly configured to use a volume of fluid in a fluid circuit for damping comprising a damping mechanism and a lockout mechanism independent of the damping mechanism configured to prevent damping by the damping mechanism and an actuator for the lockout mechanism. The lockout mechanism may comprise a valve. The suspension assembly may comprise a reservoir chamber for fluid in the fluid circuit. The lockout mechanism may be configured to provide a lockout setting. The lockout setting may be actuated by the actuator of the lockout mechanism. The damping mechanism may be configured to provide a damping setting. The lockout setting may be independent of the damping setting. The damping mechanism may comprise a low speed damping arrangement. The damping mechanism may comprise a high speed damping arrangement. The damping mechanism may comprise a high speed damping arrangement and a low speed damping arrangement.

The suspension assembly may comprise a shock assembly comprising the damping mechanism and the lockout mechanism. The actuator for the lockout mechanism may be on the shock assembly. The actuator may be remote from the lockout mechanism. The suspension assembly may be configured for a bicycle comprising a handlebar; the actuator for the lockout mechanism may be on the handlebar. The actuator may comprise a lever. The actuator may comprise a toggle switch. The actuator may comprise an on-off switch for the lockout setting to actuate the lockout mechanism through an adjuster shaft providing a passage for flow of fluid when the actuator is off and an obstruction to flow of fluid when the actuator is on to actuate the lockout mechanism. The actuator for the lockout mechanism may be configured to be adjusted without a tool. The lockout mechanism may be configured to be actuated without a tool. The lockout mechanism may be configured to be actuated by an operator of the bicycle.

The lockout mechanism may comprise a flow control element to prevent flow of fluid from the fluid circuit into the reservoir chamber when the lockout mechanism may be actuated. The lockout mechanism may comprise a blow-off valve. The high speed damping arrangement may comprise a blow-off valve. The blow-off valve for the lockout mechanism may be provided a threshold value to open; a blow-off valve for the high speed damping arrangement may be provided a threshold value to open.

The threshold value of the lockout mechanism may comprise an input to open the blow-off valve of the lockout mechanism. The threshold value of the high speed damping arrangement may comprise an input to open the blow-off valve of the high speed damping arrangement. The threshold value of the lockout mechanism may comprise an input to open the blow-off valve of the lockout mechanism; the threshold value of the high speed damping arrangement may comprise an input to open the blow-off valve of the high speed damping arrangement; and the threshold value of the lockout mechanism may be larger than the threshold value of the high speed damping arrangement. When the lockout mechanism is off an input at the threshold value of the high speed damping system will open the blow-off valve of the high-speed damping system. When the lockout mechanism is on an input at the threshold value of the lockout mechanism will open the blow-off valve of the lockout mechanism. The threshold value of the high speed damping arrangement may be adjustable. The threshold value of the lockout mechanism may comprise a separate value from the threshold value of the high speed damping arrangement. Actuation of the lockout mechanism may be independent of the actuation of the high speed damping arrangement. The lockout mechanism may comprise a flow control element. The flow control element may comprise a valve. The valve may comprise a shim stack. The high speed damping arrangement may comprise an adjuster. The low speed damping mechanism may comprise an adjuster. The adjuster may comprise a needle adjuster.

The suspension assembly may comprise a flow path for fluid through the lockout mechanism into the reservoir chamber separate from a flow path for fluid through the damping mechanism into the reservoir chamber. The lockout mechanism may be configured to be actuated without adjustment of the damping mechanism. The lockout mechanism may be configured to be turned on and turned off without modification of the damping setting of the damping mechanism. The lockout mechanism may be configured to prevent flow of fluid into the reservoir chamber at the lockout setting. The lockout mechanism may comprise a valve configured to allow flow of fluid into the reservoir chamber at the lockout setting. The lockout mechanism may comprise a valve configured to allow flow of fluid into the reservoir chamber at the lockout setting when the fluid reaches a specified pressure. The valve of the lockout mechanism may provide a threshold value to allow flow of fluid into the reservoir chamber at the lockout setting. The lockout mechanism may comprise a blow-off valve configured with a threshold value to facilitate flow into the reservoir chamber; when the lockout mechanism is on fluid cannot enter a flow path for fluid through the damping mechanism.

The present invention relates to a suspension assembly comprising a fluid circuit for a fluid configured to provide damping for a bicycle. The suspension assembly comprises a damping mechanism configured to provide a damping setting for damping and a lockout mechanism configured to provide a lockout setting to prevent flow of the fluid through the damping mechanism and an actuator to actuate the lockout mechanism; the lockout mechanism may be configured to provide the lockout setting when on and to permit damping at the damping setting by the damping mechanism when off. The lockout mechanism may be configured to provide a lockout setting to lock out damping by the damping mechanism. The suspension assembly may comprise a reservoir chamber for flow of fluid in the fluid circuit. The damping mechanism may be inoperative when the lockout mechanism may be turned on to provide the lockout setting without damping; the damping mechanism may be operative to provide damping at the damping setting when the lockout mechanism may be turned off. The damping mechanism may comprise a low speed damping arrangement. The damping mechanism may comprise a high speed damping arrangement. The damping mechanism may comprise a high speed damping arrangement and a low speed damping arrangement.

The suspension assembly may comprise a shock assembly comprising the damping mechanism and the lockout mechanism. The actuator for the lockout mechanism may be on the shock assembly. The actuator for the lockout mechanism may be remote from the shock assembly. The actuator may comprise a lever. The actuator may comprise a toggle switch. The actuator for the lockout mechanism may be configured to be adjusted without a tool. The lockout mechanism may comprise a flow control element. The flow control element may comprise a valve. The flow control element may comprise at least one of (1) an adjuster shaft or (2) an adjuster shaft configured to be rotated from an open position to provide a passage for flow of fluid and an closed position to provide an obstruction to flow of fluid and/or (3) a blow-off valve or (4) a blow-off valve comprising a shim stack. The high speed damping arrangement may comprise a blow-off valve. The blow-off valve for the lockout mechanism may be provided a threshold value; a blow-off valve for the damping mechanism may be provided a threshold value. The threshold value of the lockout mechanism may comprise an input to open the blow-off valve of the lockout mechanism. The threshold value of the high speed damping arrangement may comprise an input to open the blow-off valve of the damping mechanism. The threshold value of the lockout mechanism may comprise an input to open the blow-off valve of the lockout mechanism; the threshold value of the damping mechanism may comprise an input to open the blow-off valve of the damping mechanism; and the threshold value of the lockout mechanism may be larger than the threshold value of the damping mechanism. The threshold value of the lockout mechanism may comprise a separate value from the threshold value of the damping mechanism. The threshold value of the damping mechanism may be adjustable. Actuation of the lockout mechanism may be independent of adjustment of the damping mechanism. The damping mechanism may comprise a low speed damping system. The damping mechanism may comprise a high speed damping system. The damping mechanism may comprise an adjustable low speed damping system. The damping mechanism may comprise an adjustable high speed damping system.

The present invention relates to a suspension system comprising a fluid circuit for a fluid configured to provide damping for a bicycle comprising a damping mechanism configured to provide a damping setting for damping and a lockout mechanism configured to provide a lockout setting and comprising (a) a flow control element configured in the lockout setting to prevent flow of the fluid through the damping mechanism and (b) a flow control element configured to allow flow to a reservoir chamber of the fluid circuit if the pressure of the fluid may be greater than a threshold value. The suspension system may comprise an actuator for the lockout mechanism configured to actuate the flow control element configured to prevent flow through the damping mechanism; the lockout mechanism may be configured to provide the lockout setting when on and to permit damping at the damping setting by the damping mechanism when off. The flow control element of the lockout mechanism configured to provide a lockout setting to lock out damping by the damping mechanism may comprise an adjuster shaft. The damping mechanism may be inoperative when the lockout mechanism may be turned on to provide the lockout setting without damping; the damping mechanism may be operative to provide damping at the damping setting when the lockout mechanism may be turned off. The damping mechanism may comprise a high speed damping arrangement and a low speed damping arrangement. The suspension system may comprise a shock assembly comprising the damping mechanism and the lockout mechanism. The actuator may comprise a toggle switch. The flow control element configured to allow flow may comprise a valve. The valve may comprise a blow-off valve. The high speed damping arrangement may comprise a blow-off valve. The blow-off valve for the lockout mechanism may be provided the threshold value; a blow-off valve for the damping mechanism may be provided a threshold value. The threshold value of the lockout mechanism may comprise an input to open the blow-off valve of the lockout mechanism. The threshold value of the high speed damping arrangement may comprise an input to open the blow-off valve of the damping mechanism. The threshold value of the lockout mechanism may comprise an input to open the blow-off valve of the lockout mechanism; the threshold value of the damping mechanism may comprise an input to open the blow-off valve of the damping mechanism; and the threshold value of the lockout mechanism may be larger than the threshold value of the damping mechanism. The threshold value of the lockout mechanism may comprise a separate value from the threshold value of the damping mechanism. The threshold value of the damping mechanism may be adjustable. Actuation of the lockout mechanism may be independent of adjustment of the damping mechanism. The damping mechanism may comprise an adjustable high speed damping system. The adjuster shaft may be configured to be rotated by the actuator from an open position to provide a passage for flow of fluid to a closed position to provide an obstruction to flow of fluid. The adjuster shaft provides a passage for flow of fluid when the actuator is off and an obstruction to flow of fluid when the actuator is on to actuate the lockout mechanism.

FIGURES

FIG. 1 is schematic perspective view of a bicycle according to an exemplary embodiment.

FIGS. 2 and 3 schematic perspective views of a suspension assembly for a bicycle according to an exemplary embodiment.

FIGS. 5 through 7 are schematic exploded views of a suspension assembly for a bicycle according to an exemplary embodiment.

FIGS. 8 and 9 are schematic side elevation views of a suspension assembly for a bicycle according to an exemplary embodiment.

DESCRIPTION

Figure 1:
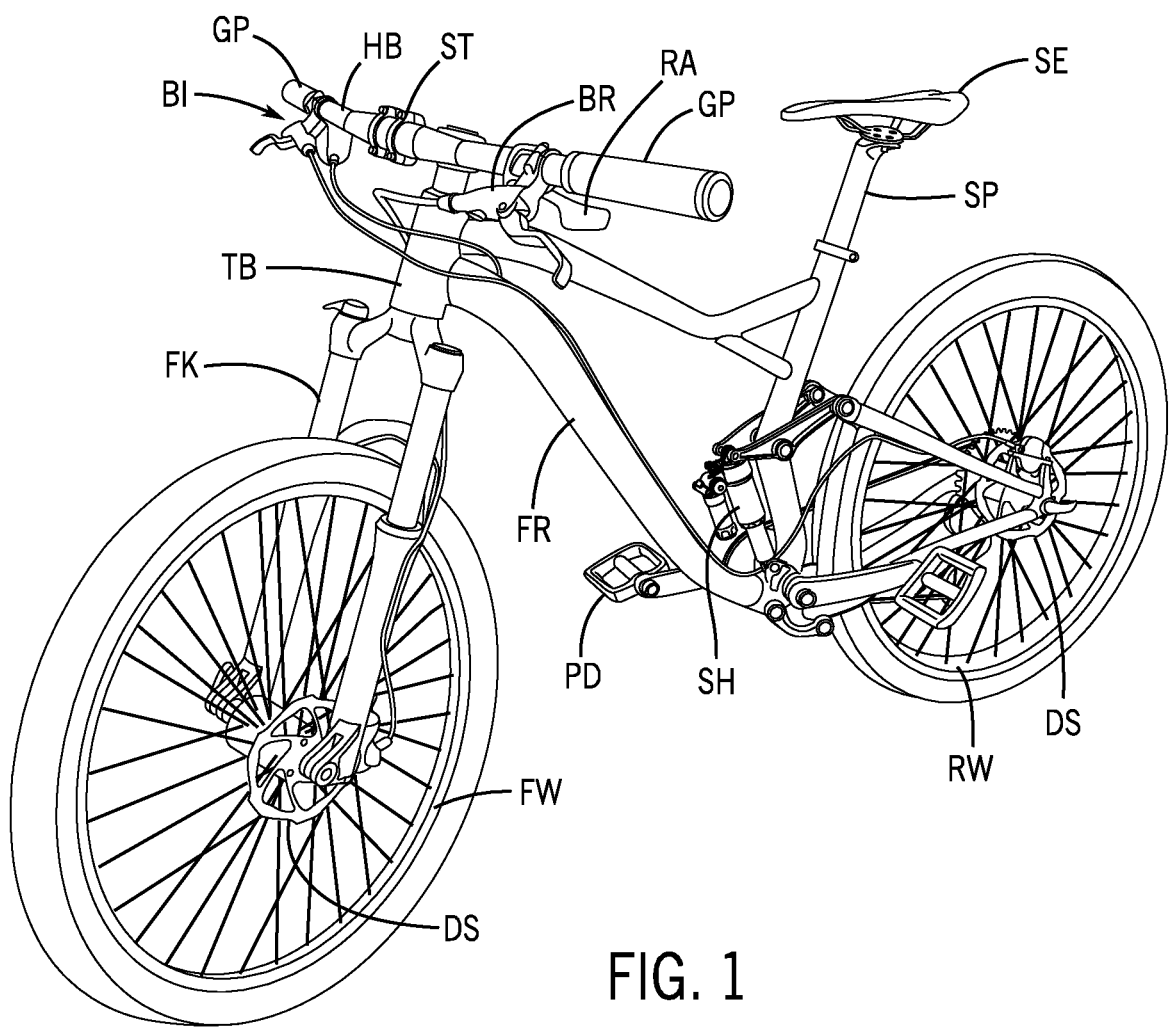

Referring to FIG. 1, a bicycle BI (such as a mountain bike) is shown schematically according to an exemplary embodiment providing an arrangement of parts/components including a frame FR with a steering tube TB and a seat post SP (with seat SE) and a set of wheels comprising front wheel FW with a front fork assembly FK and rear wheel RW coupled to the frame FR and through a rear shock absorber SH (of a suspension system) and a set of pedals PD; the bicycle provides handlebar HB (coupled to front wheel FW through stem ST and front fork assembly FK and through steering tube T) with a grip GP and controls for a brake system BR coupled to a brake disc DS (e.g. rotor at/on each of front wheel FW and rear wheel RW) and a remote actuator RA.

Referring to FIGS. 1, 2-3, 8-9 and 33, a suspension system/assembly for the rear wheel of the bicycle and configured to provide suspension damping through a damping system/mechanism is shown schematically according to an exemplary embodiment. See also FIGS. 10 through 31 and 34 (detail/operation views of the system/assembly). As shown schematically in FIGS. 32 and 33, a suspension system for a bicycle comprises a damping system/mechanism configured to facilitate flow of hydraulic/suspension fluid (e.g. a contained volume of fluid) to provide suspension damping as the rear wheel of the bicycle encounters irregularities (e.g. bumps, obstacles, holes, etc.); with damping system/mechanism in operation (e.g. to provide suspension damping in response to an input such as from an irregularity encountered by the rear wheel) the suspension tube will be compressed/shortened (e.g. initiating a stroke); after the input, the suspension tube will return to the default/extended condition (e.g. completing the stroke and ready to encounter input to provide suspension damping at the rear wheel). See FIG. 34 (schematic graph/diagram with broken line representation of input/output response of suspension system with damping mechanism to irregularities, etc.). Compare FIG. 32 (schematic diagram of a conventional suspension system with a damping system and without a separate lockout mechanism) and FIG. 33 (schematic diagram of suspension system with a damping mechanism and with separate lockout system/mechanism).

As indicated schematically according to an exemplary embodiment in the FIGS. 2, 3, 4, 4A-4B, 6, 8-9, 30-31 and 33, a separate lockout system/mechanism can be provided for the suspension system/assembly. See FIG. 33 (schematic diagram of suspension system with a damping mechanism and with separate lockout system/mechanism) and FIG. 34 (schematic graph/diagram with solid line representation of input/output response of suspension system with lockout mechanism turned on).

As indicated schematically according to an exemplary embodiment in FIGS. 2-3, 4, 4A-4B, 8-9, 11, 14, 17-18, 21, 24, 27, 30-31 and 33, the lockout system/mechanism is configured be actuated by an actuator (such as an adjuster, lever, remote adjuster, etc.) and to operate independently of the damping system/mechanism of the suspension system/assembly; when the lockout system/mechanism is "on" (e.g. actuated from "off" to "on" by the actuator/adjuster) the lockout mechanism will prevent suspension damping by the damping system/mechanism (i.e. the suspension system will "stiffen" the ride without damping unless/until a "blow-off" point/condition for the lockout mechanism PL); when the lockout system/mechanism is "off" (e.g. actuated to "off" by the actuator/adjuster) the lockout mechanism will be inoperative and suspension damping by the damping system/mechanism will function (i.e. the suspension system will provide damping including a "blow-off" point/condition for the damping mechanism at/about P). See FIG. 34 (schematic diagram indicating input/output for suspension system with lockout turned off with damping settings in broken lines at/below point P/"blow-off" point of damping mechanism and with lockout turned on setting along solid line to point PL/"blow-off" point of lockout mechanism). Compare FIG. 32 (schematic diagram of a conventional suspension system with a damping system and without a separate lockout mechanism) and FIG. 33 (schematic diagram of suspension system with a damping mechanism and with separate lockout system/mechanism).

As shown schematically in FIGS. 2, 3, 4, 4A-4B, 5, 6, 7 and 33, the suspension system SH comprises a suspension tube/tube assembly and a reservoir tube; the suspension tube assembly is configured to provide a main/primary chamber in a lower tube shown as damper tube 10 and a secondary chamber in an upper tube/casting shown as air can 12 (comprising an air piston 14) with a shaft assembly 18 providing a passage 18a to contain the fluid; the reservoir tube 26 is configured to provide a reservoir chamber to contain the fluid.

When the suspension system is in a default state (e.g. not in use or not providing suspension damping) the volume of hydraulic fluid will be contained in the suspension tube assembly (e.g. main chamber, secondary chamber and reservoir chamber); the lower tube and upper tube of the suspension tube assembly is in a default/extended condition (e.g. ready to initiate a stroke). In operation when the suspension system is use (e.g. to provide suspension damping in response to an input such as from an irregularity encountered by the rear wheel) the suspension tube will be compressed (e.g. initiating a stroke) with lower tube entering the upper tube and fluid previously contained in the main chamber of the lower tube will flow into the secondary chamber of the upper tube (through a flow control element/valve arrangement shown schematically) and into the reservoir chamber of the reservoir tube (through a flow control element/valve arrangement shown schematically). After the input, the suspension tube will return to the default/extended condition (e.g. completing the stroke and ready to encounter input to provide suspension damping at the rear wheel) with flow of fluid returning from the reservoir chamber to the main chamber and from the secondary chamber to the main chamber.

As indicated schematically, the suspension system is configured to provide suspension damping for any of a wide variety of inputs/irregularities encountered at the rear wheel of the bicycle in operation/use; such inputs/irregularities encountered by the suspension system may vary widely in magnitude and/or frequency (e.g. high speed, low speed, etc.). See e.g. FIG. 34. As indicated schematically in FIGS. 5, 7 and 33, the flow control arrangement of the damping system may be configured to provide for variations in suspension damping dependent upon the nature of the input (e.g. with a "high-speed" damping mechanism/arrangement and a "low-speed" damping mechanism/arrangement). As indicated schematically in FIG. 34, the response of the suspension system (e.g. as felt/experienced by a rider of the bicycle) may within a range be set and/or adjusted for operation according to preference or other parameters to provide a "feel" that is more "stiff" (e.g. to provide less suspension damping) or more "soft" (e.g. to provide more suspension damping) by configuration and/or adjustment of flow control arrangement/elements (e.g. valves, etc.) of the suspension system.

As indicate schematically in FIGS. 2, 3, 4, 4A-4B, 5, 6, 7, 8 and 9, the suspension system/assembly SH may provide a damping system/mechanism and a lockout system/mechanism. As shown schematically according to an exemplary embodiment in FIGS. 4, 5, 7 and 33, the damping system/mechanism may comprise a flow control arrangement configured to provide low-speed damping and a flow control arrangement configured to provide high-speed damping. See also FIGS. 14, 17 and 18.

As shown schematically according to an exemplary embodiment in FIGS. 4, 4A-4B, 6 and 33, the lockout system/mechanism may comprise a flow control arrangement configured for actuation of the lockout mechanism (e.g. a flow control element with adjuster to be adjusted/switched between "on" and "off") and a flow control arrangement configured to operates as a valve (e.g. blow-off valve configured with a threshold value by design, adjustment, modification, etc.). See also FIGS. 17-18 and 30-31.

Figure 4:
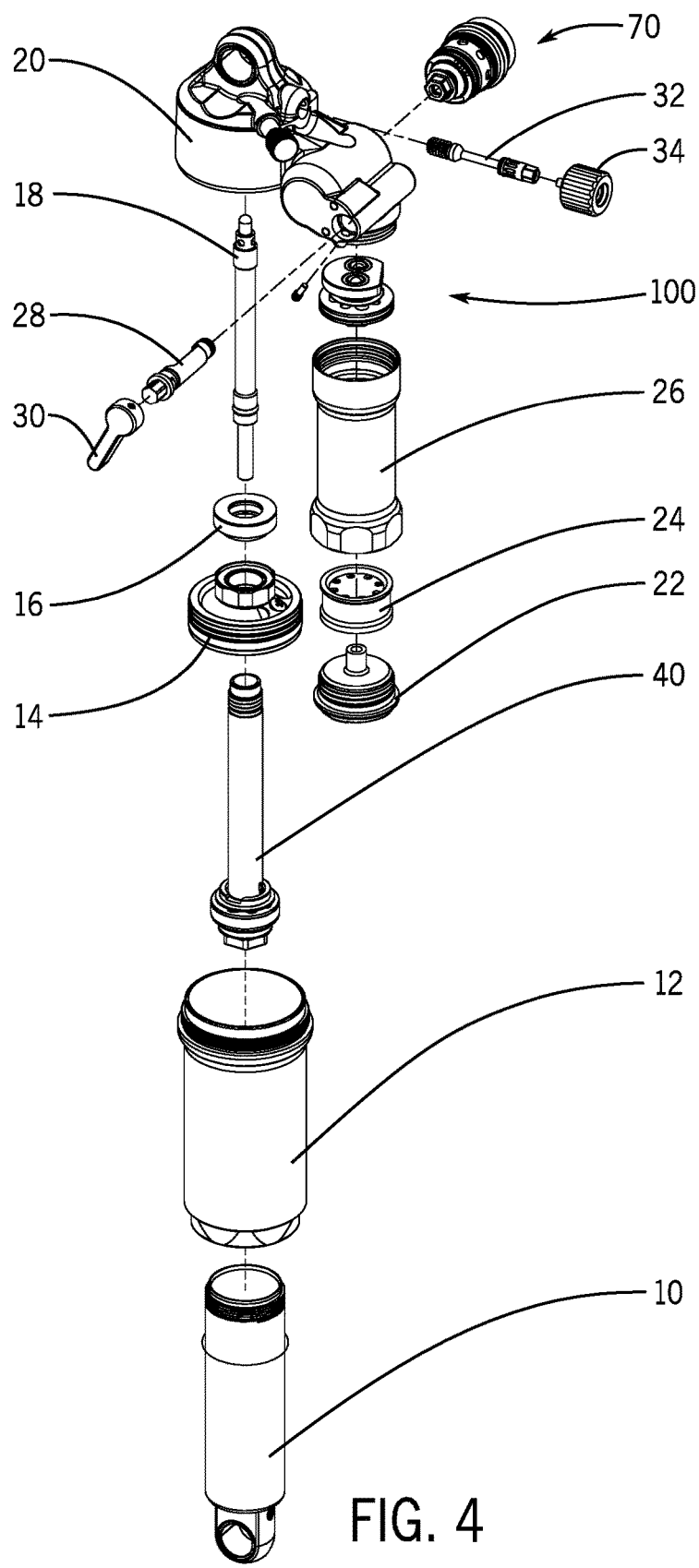
FIG. 4 is a schematic exploded view of a suspension assembly for a bicycle according to an exemplary embodiment.
Figure 4A:
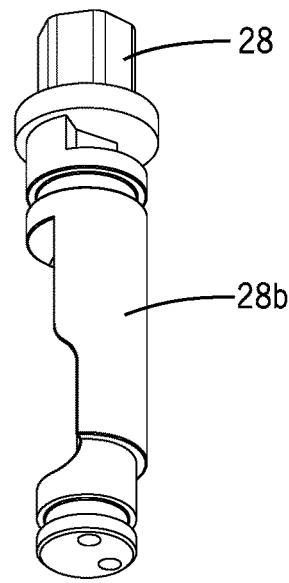
FIGS. 4A and 4B are schematic views of an adjuster for a lockout mechanism of a suspension assembly for a bicycle according to an exemplary embodiment.
Figure 4B:
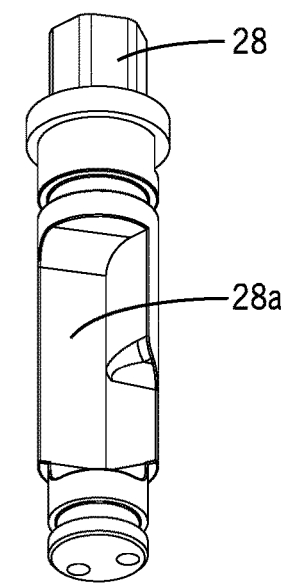
Figure 10:
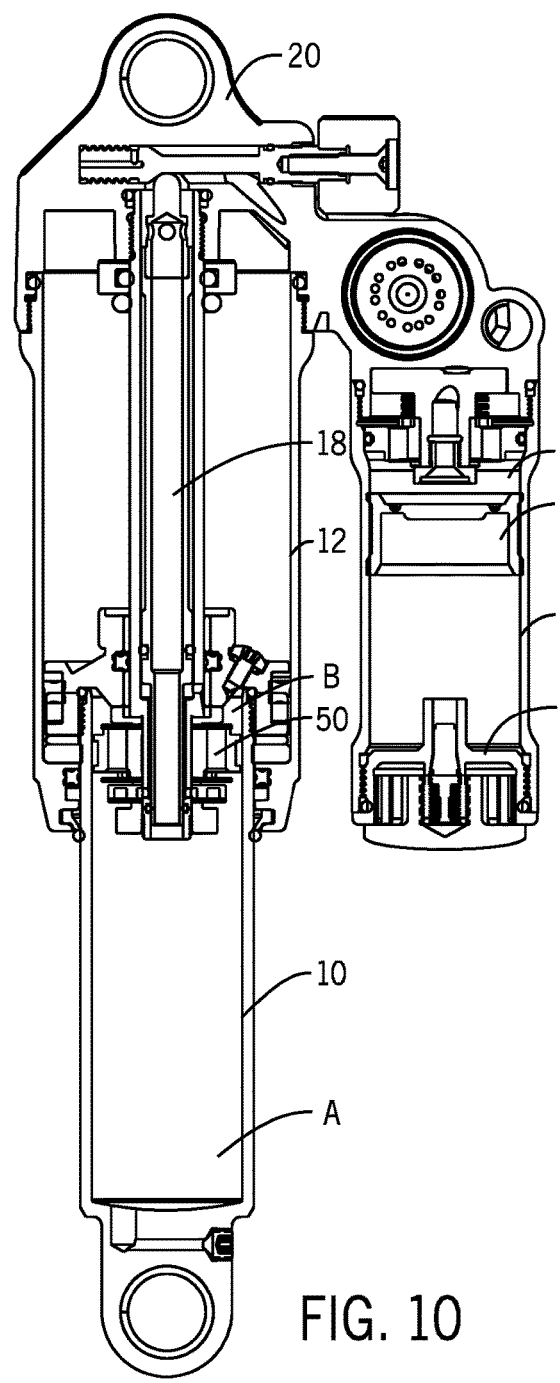
FIGS. 10 and 11 are schematic side elevation cross-section views of a suspension assembly for a bicycle according to an exemplary embodiment.
Figure 11:
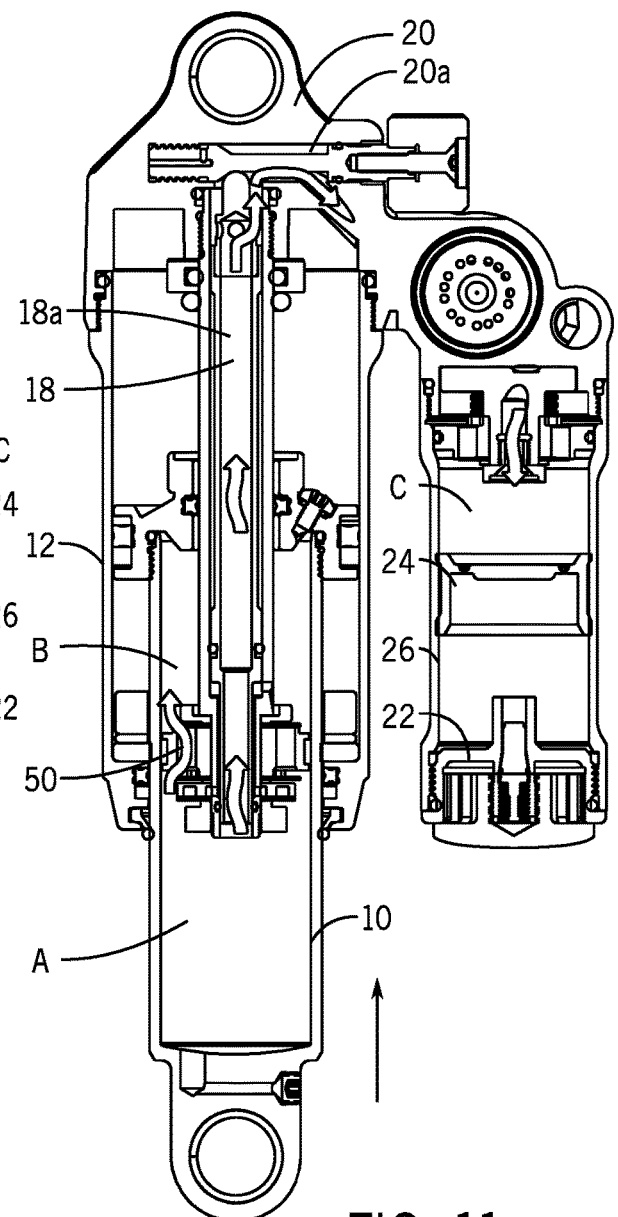
Figure 12:
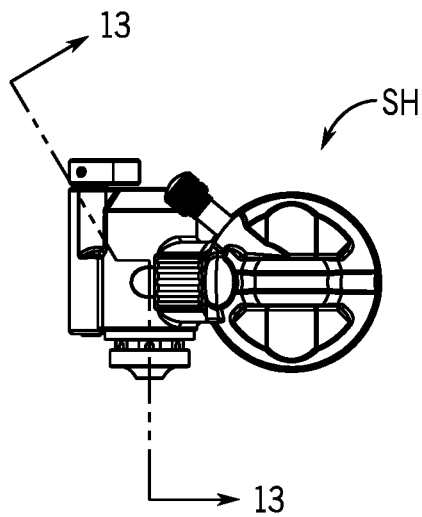
FIG. 12 is a schematic top plan view of a suspension assembly for a bicycle according to an exemplary embodiment.
Figure 13:
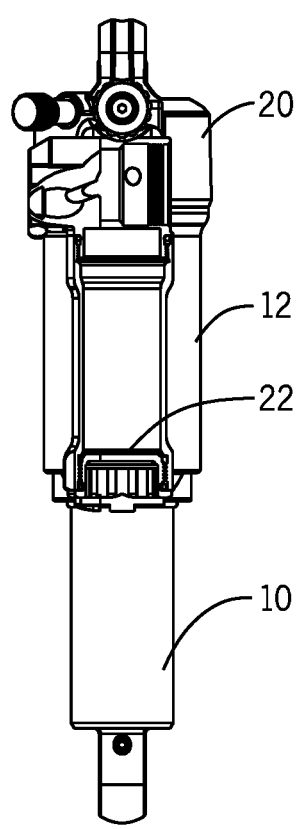
FIGS. 13 and 14 are schematic side elevation cross-section views of a suspension assembly for a bicycle according to an exemplary embodiment.
Figure 14:
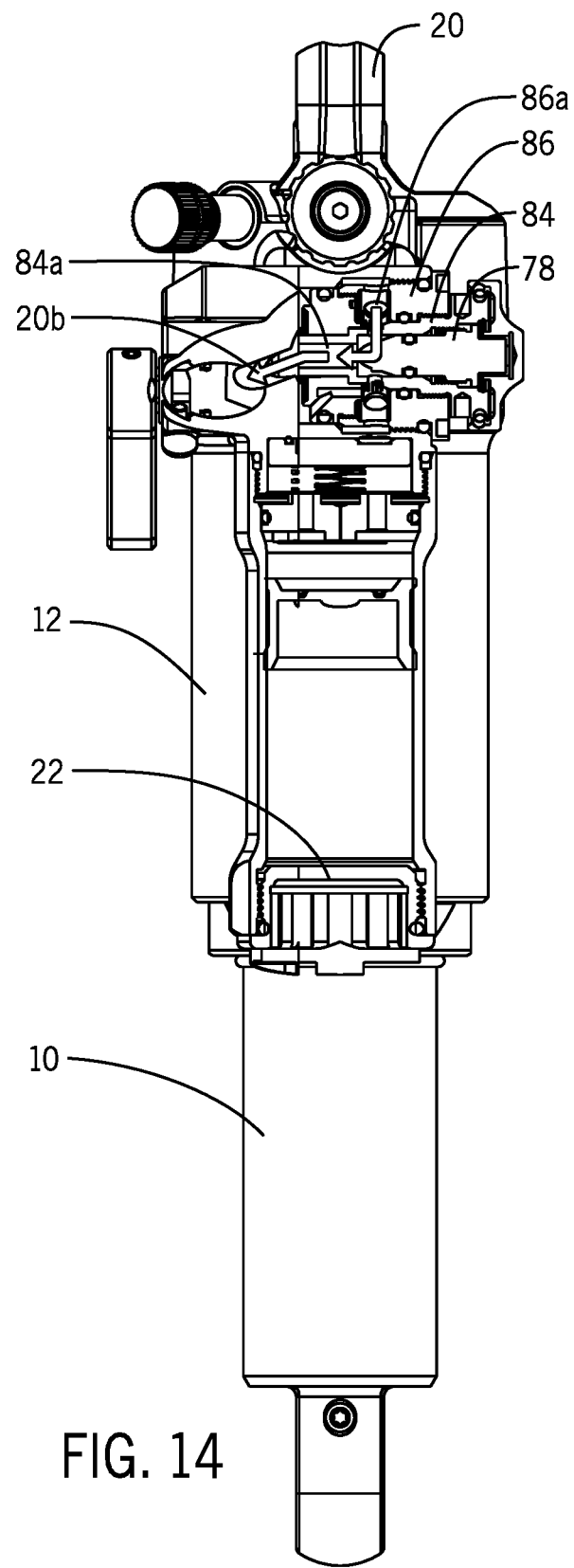
Figure 15:
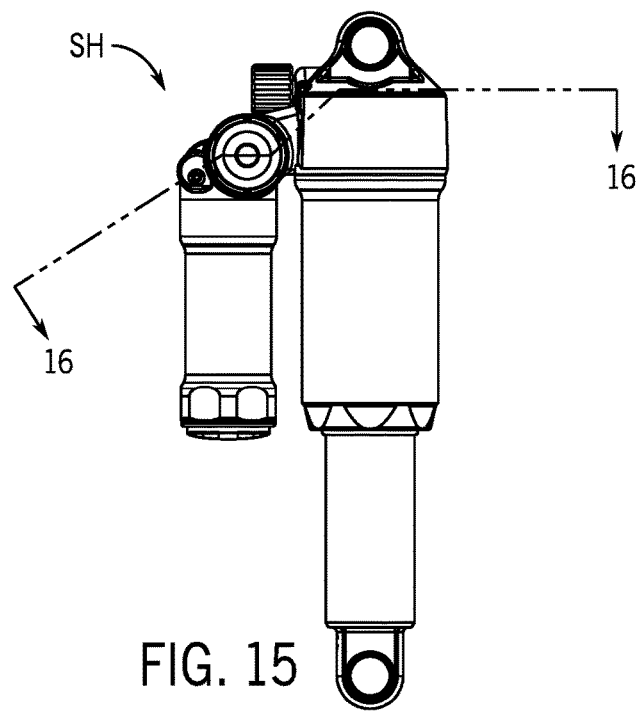
FIG. 15 is a schematic side elevation view of a suspension assembly for a bicycle according to an exemplary embodiment.
Figure 16:
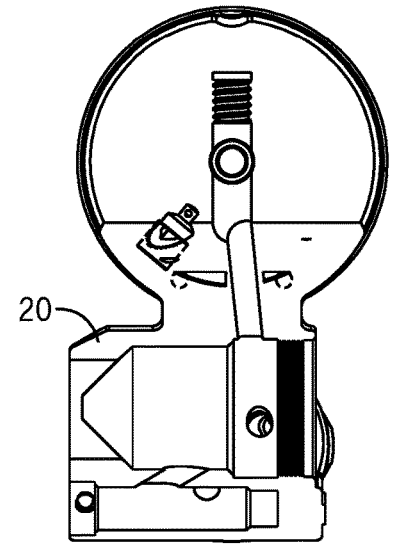
FIGS. 16 through 18 are schematic top plan cross-section views of a suspension assembly for a bicycle according to an exemplary embodiment.
Figure 17:
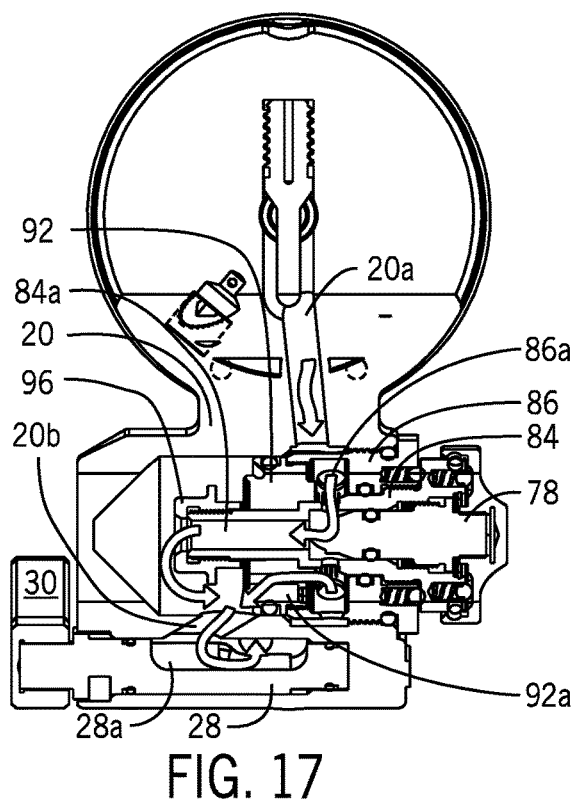

As shown schematically according to an exemplary embodiment in FIGS. 4 and 4A-4B, the lockout system/mechanism comprises flow control element/arrangement with a lockout lever/adjuster 30 coupled to a lockout adjuster shaft 28 providing an opening/passage 28*a* and a wall/obstruction 28*b* and installed within a housing of the top cap assembly 20; lever/adjuster 30 comprises a switch configured to actuate the lockout mechanism through rotation of the adjuster shaft 28 to align the opening/passage 28*a* to create a flow path or to align the wall/obstruction 28*b* to obstruct a flow path. Compare FIG. 17 (lockout system/mechanism not actuated/"off" with flow path established) and FIG. 18 (lockout system/mechanism actuated/"on" with passage/flow path obstructed).

As shown schematically according to an exemplary embodiment in FIGS. 4 and 6, the lockout system/mechanism comprises a flow control element/arrangement with a piston assembly 100 comprising a piston seat 102 providing a first passage 102*a* and a second passage 102*b* and a spring 104 with a set of shims 106 and 110 and a lockout piston 108 providing a passage 108*a* secured by a retaining bolt 112 providing passage 112*a*; the piston assembly/arrangement and set of shims is configured to function as a valve to obstruct flow unless opened (e.g. unless opened due to a pressure higher than the threshold value established by design, adjustment, etc.). Compare FIG. 30 (lockout system/mechanism actuated and flow at blow-off valve obstructed/closed with pressure below threshold setting) and FIG. 31 (lockout system/mechanism actuated and flow at blow-off valve open due to pressure above threshold setting). As indicated schematically in FIG. 31, if the threshold setting for the blow-off valve is reached fluid will flow through the blow-off valve into the reservoir chamber.

As shown schematically in FIGS. 11, 14, 17, 21 and 24, when the lockout system is not actuated, the damping system/mechanism is in operation to provide suspension damping (e.g. flow of fluid through the fluid circuit including through the damping system/mechanism and through the adjuster shaft 28 (with passage 28*a*) and into the reservoir chamber/reservoir tube).

Figure 18:
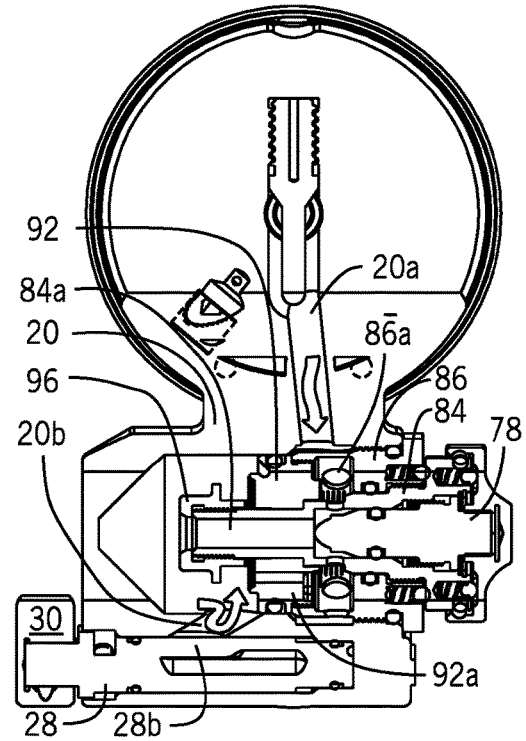
Figure 19:
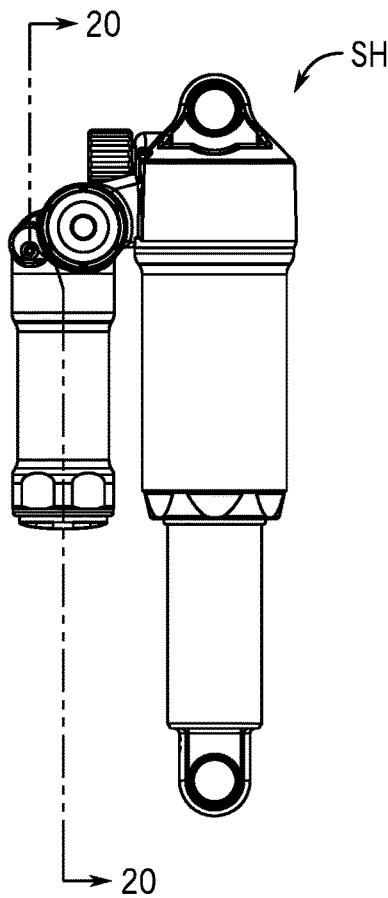
FIG. 19 is a schematic side elevation view of a suspension assembly for a bicycle according to an exemplary embodiment.
Figure 20:
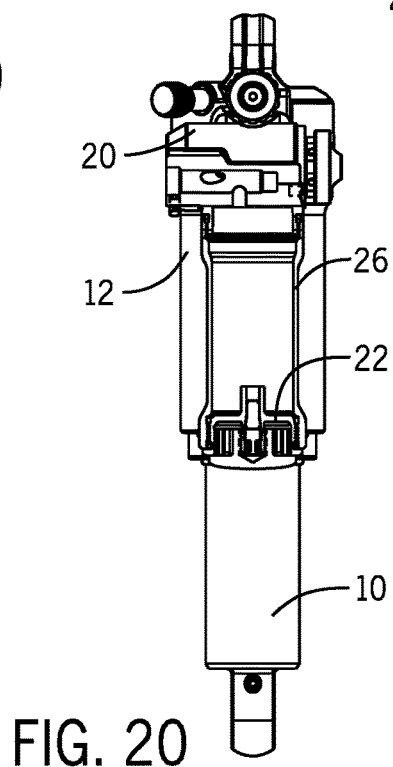
FIGS. 20 and 21 are schematic side elevation cross-section views of a suspension assembly for a bicycle according to an exemplary embodiment.
Figure 21:
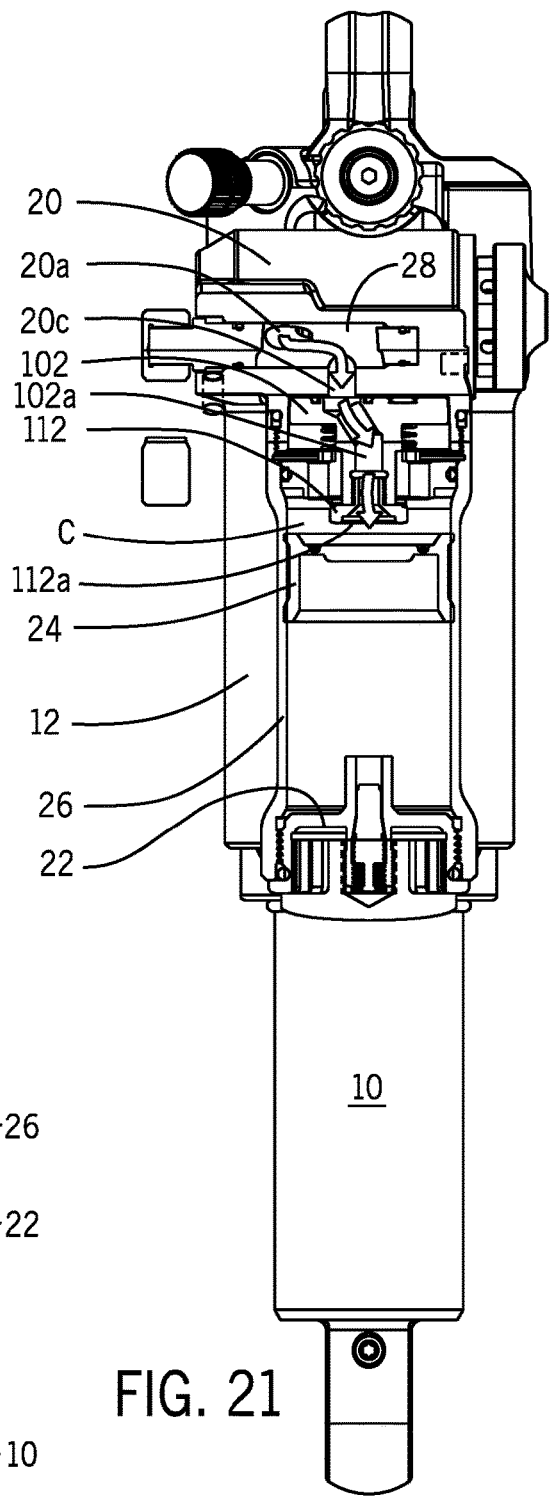
Figure 22:
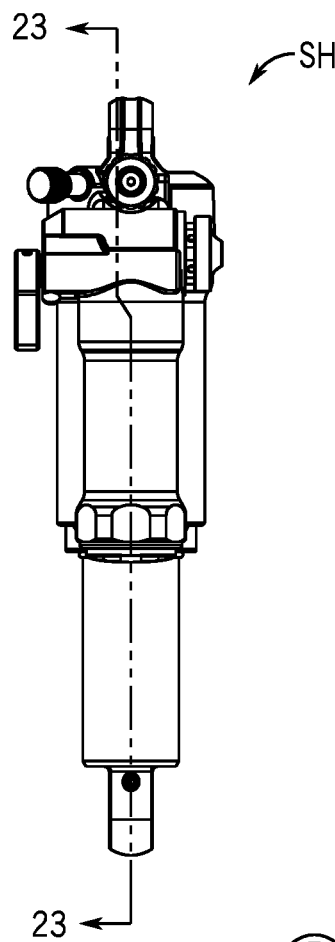
FIG. 22 is a schematic side elevation view of a suspension assembly for a bicycle according to an exemplary embodiment.
Figure 23:
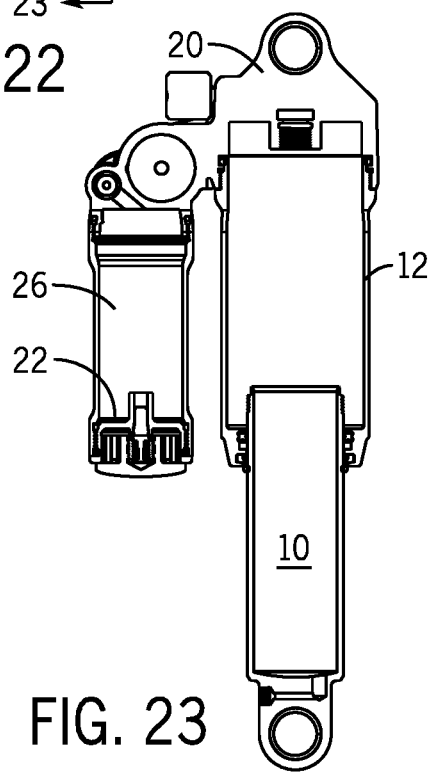
FIGS. 23 and 24 are schematic side elevation cross-section views of a suspension assembly for a bicycle according to an exemplary embodiment.
Figure 24:
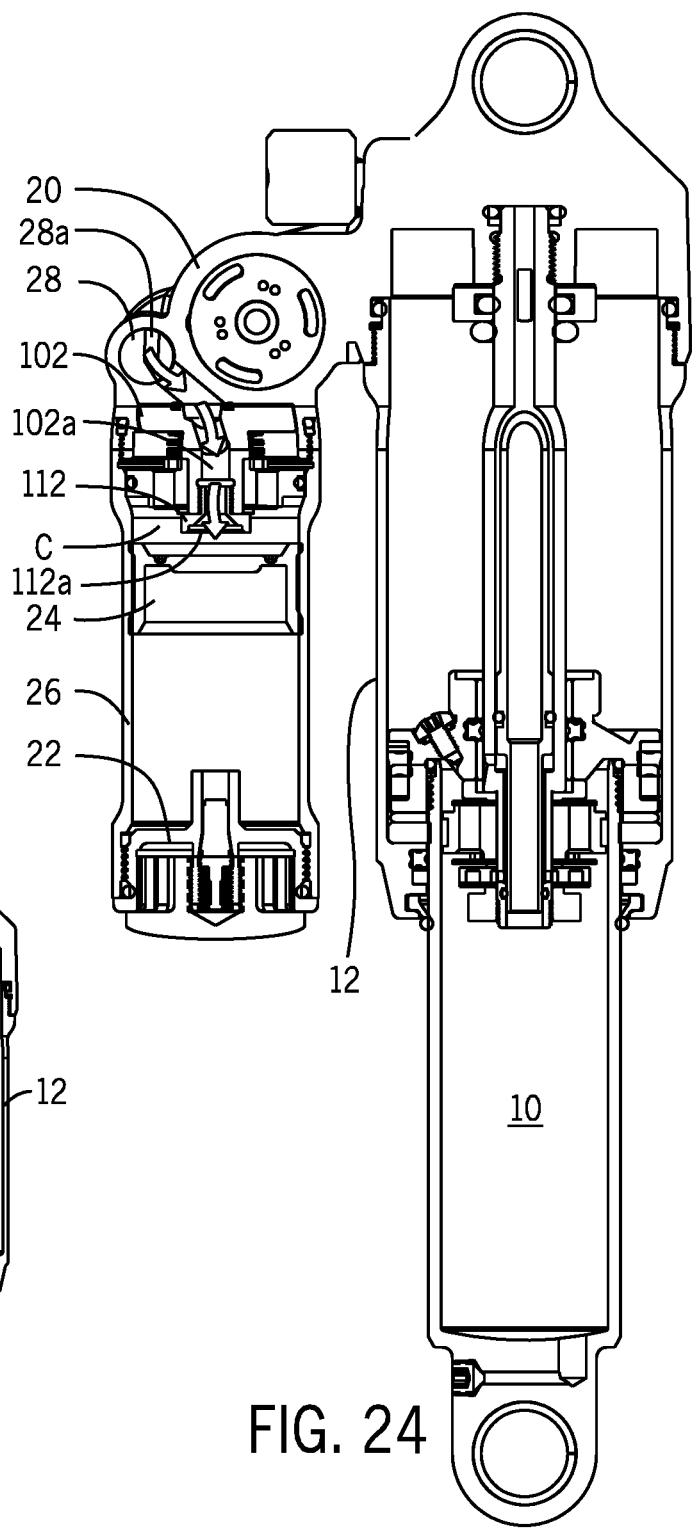
Figure 25:
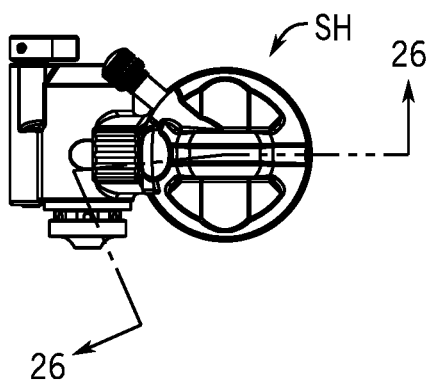
FIG. 25 is a schematic top plan view of a suspension assembly for a bicycle according to an exemplary embodiment.
Figure 26:
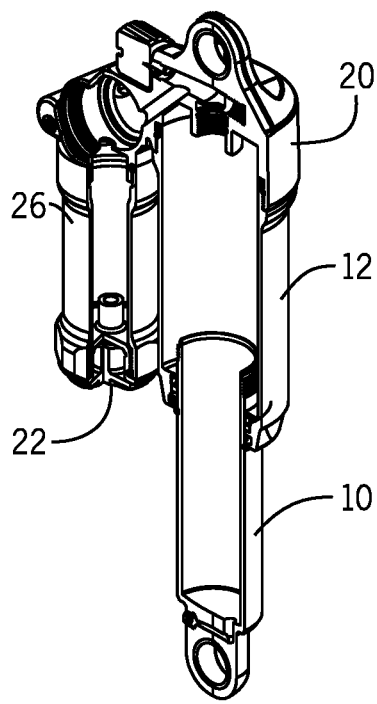
FIGS. 26 and 27 are schematic perspective cross-section views of a suspension assembly for a bicycle according to an exemplary embodiment.
Figure 27:
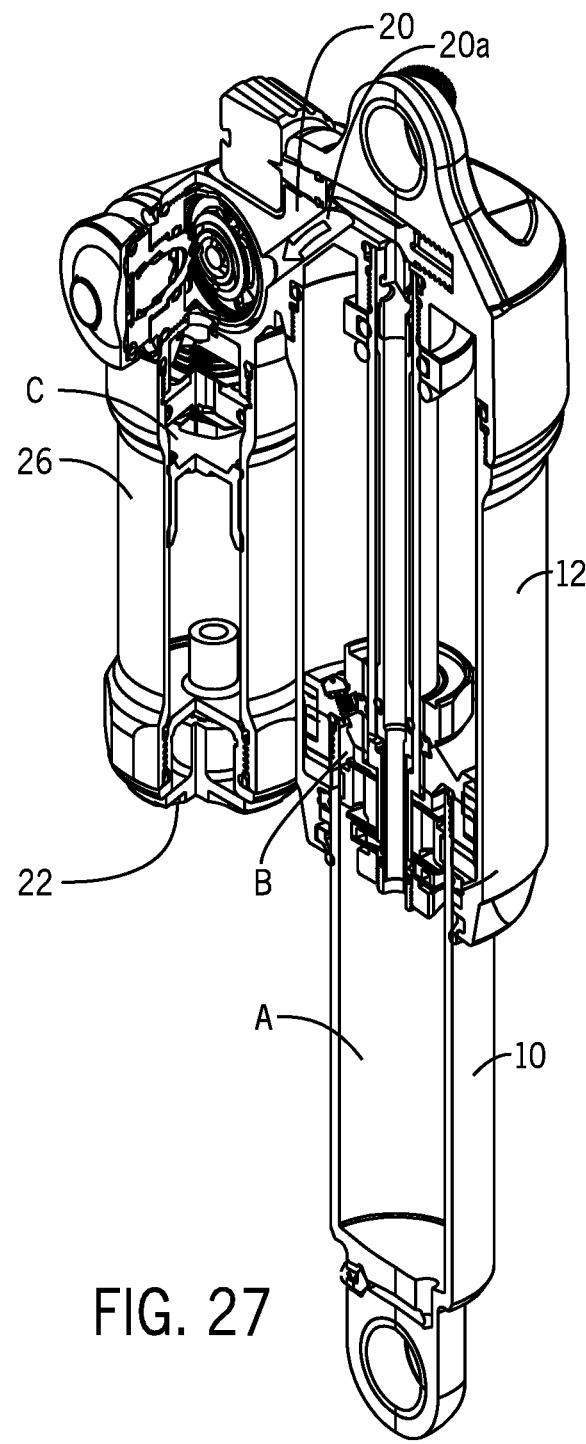
Figure 29:
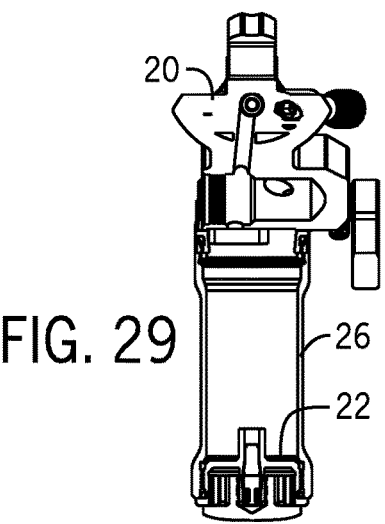
FIG. 29 is a schematic side elevation cross-section view of a suspension assembly for a bicycle according to an exemplary embodiment.
Figure 28:
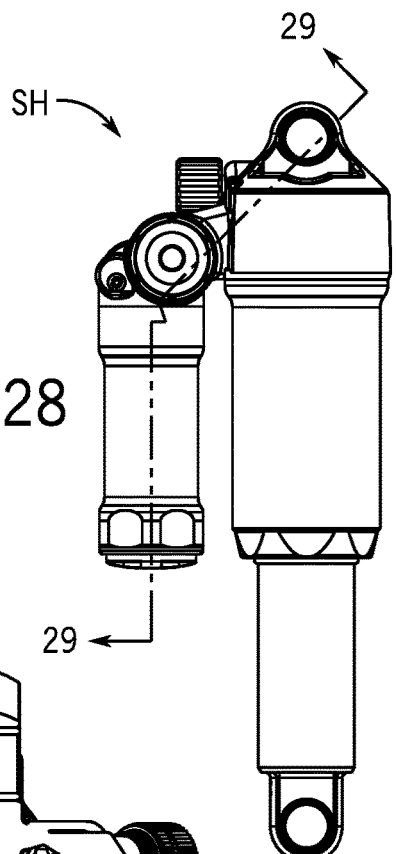
FIG. 28 is a schematic side elevation view of a suspension assembly for a bicycle according to an exemplary embodiment.
Figure 30:
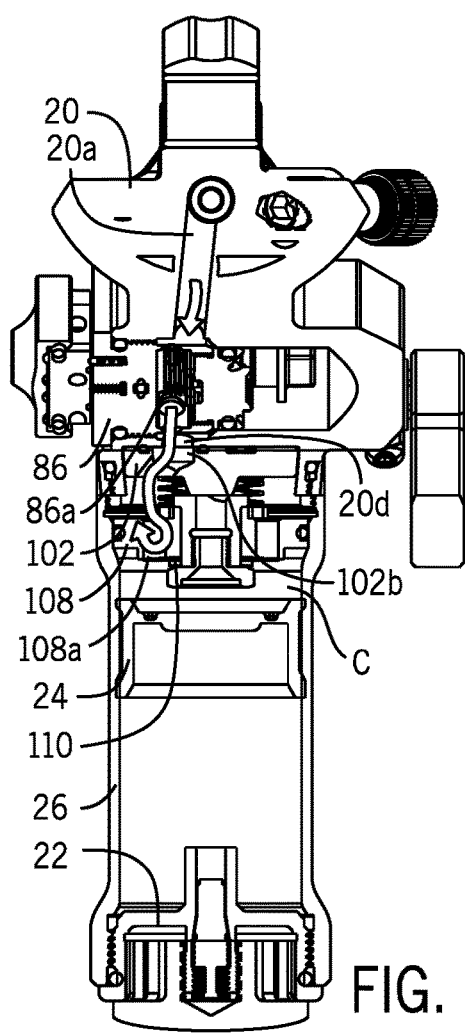
FIGS. 30 and 31 are schematic side elevation cross-section views of a suspension assembly for a bicycle according to an exemplary embodiment.

As shown schematically in FIGS. 18 and 30, when the lockout system is actuated, flow of fluid into the reservoir chamber in the reservoir tube is obstructed/blocked; the damping system/mechanism is "locked out" (e.g. the damping mechanism will provide no stroke/in effect little to no damping effect in operation insofar as the suspension tube assembly will not compress/shorten and lower tube will not compress into upper tube because the volume of contained fluid must remain in the main chamber and secondary chamber unable to flow into the reservoir chamber); when the lockout system is actuated, the suspension will provide a rigid (e.g "stiff") feel for the rider of the bicycle notwithstanding the frequency and/or magnitude of inputs/irregularities encountered at the rear wheel of the bicycle. See FIGS. 33 and 34.

Figure 31:
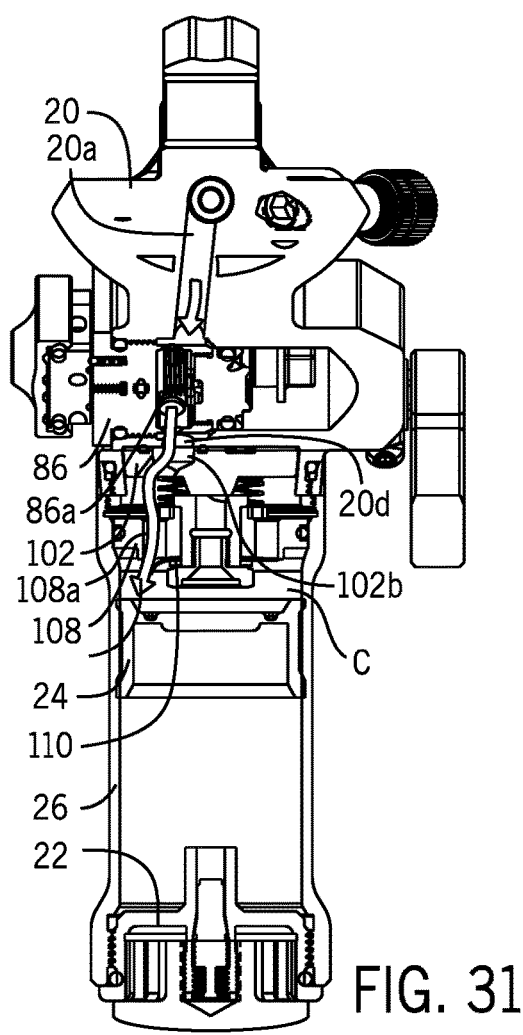
Figure 34:
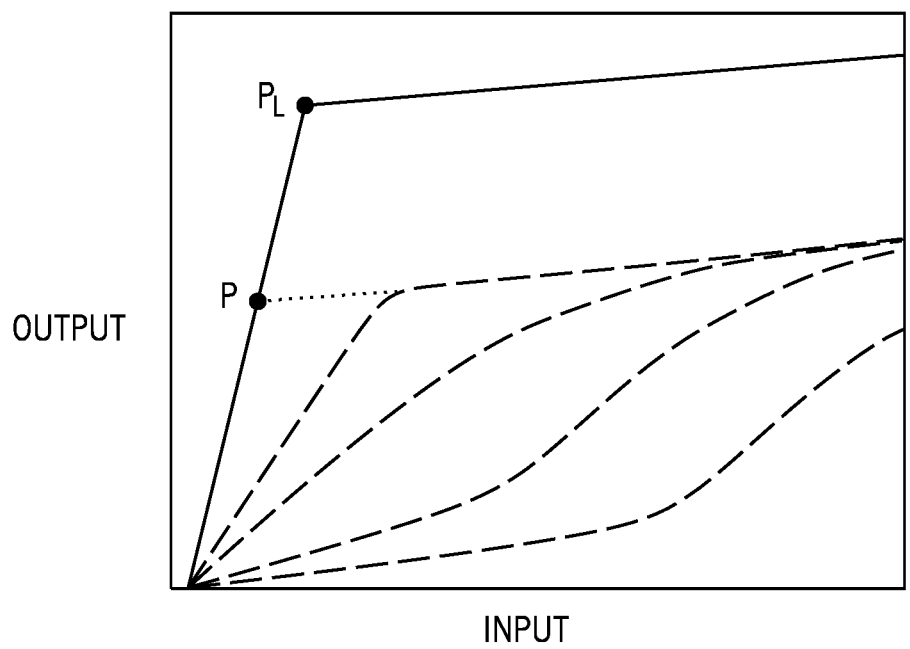
FIG. 34 is a schematic diagram of operation of a suspension assembly according to an exemplary embodiment.

As indicated schematically in FIGS. 18, 30 and 34, when the lockout system/mechanism is actuated (e.g. "on"), the suspension system will not provide suspension damping (e.g. the damping system/mechanism is locked out/obstructed by adjuster shaft 28); as indicated schematically in FIGS. 18, 31 and 34, if an input/irregularity of large magnitude is encountered (e.g. greater than a threshold value) when the lockout system/mechanism is actuated, a flow control element of the lockout mechanism (e.g. a valve shown as a "blow-off" valve arrangement 100) will open and allow flow of fluid into the reservoir tube/reservoir chamber. See also FIG. 34 (indicating "blow-off" point PL for the lockout mechanism).

Exemplary Embodiments

Figures 2, 3:
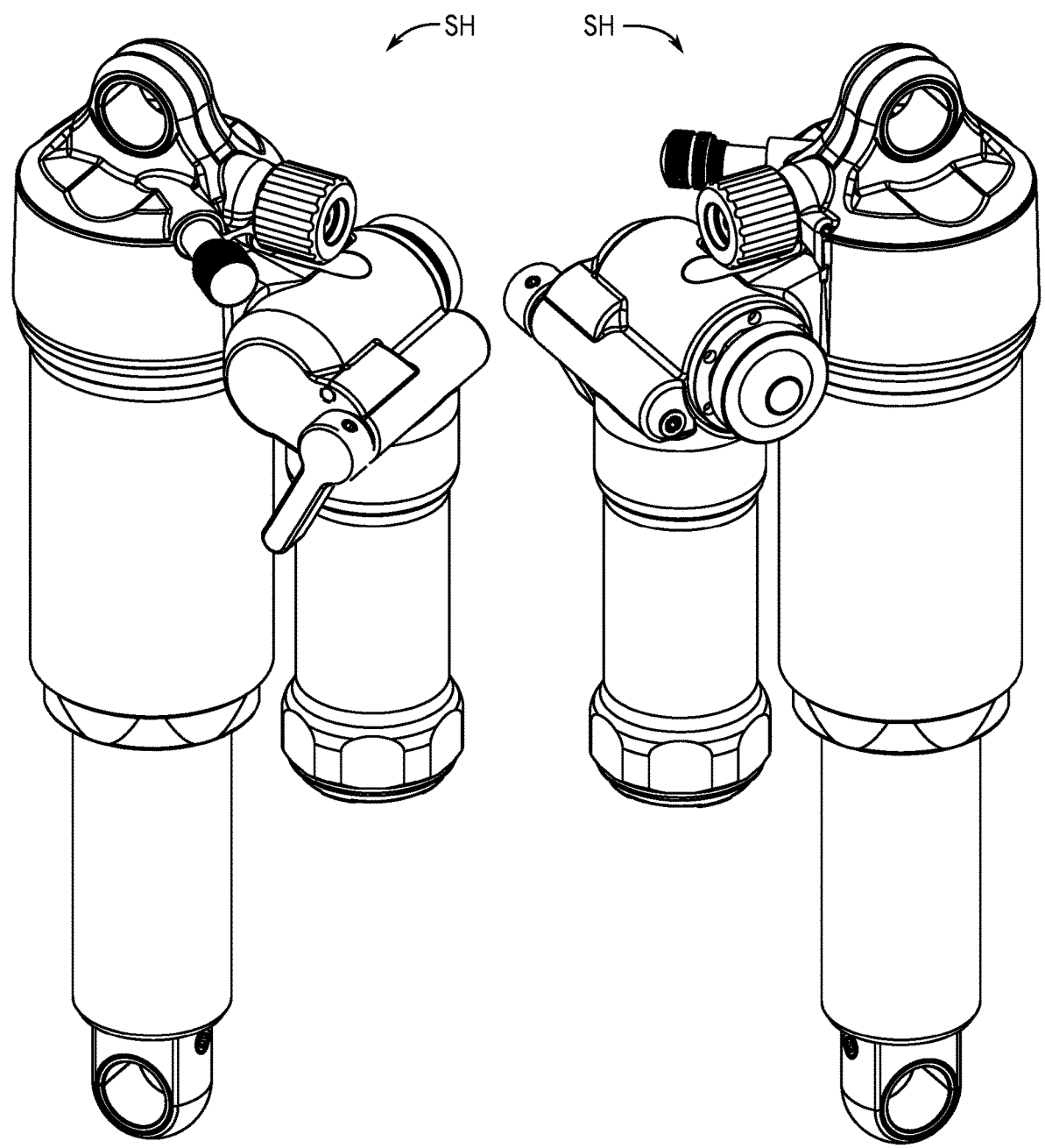
Figures 32, 33:
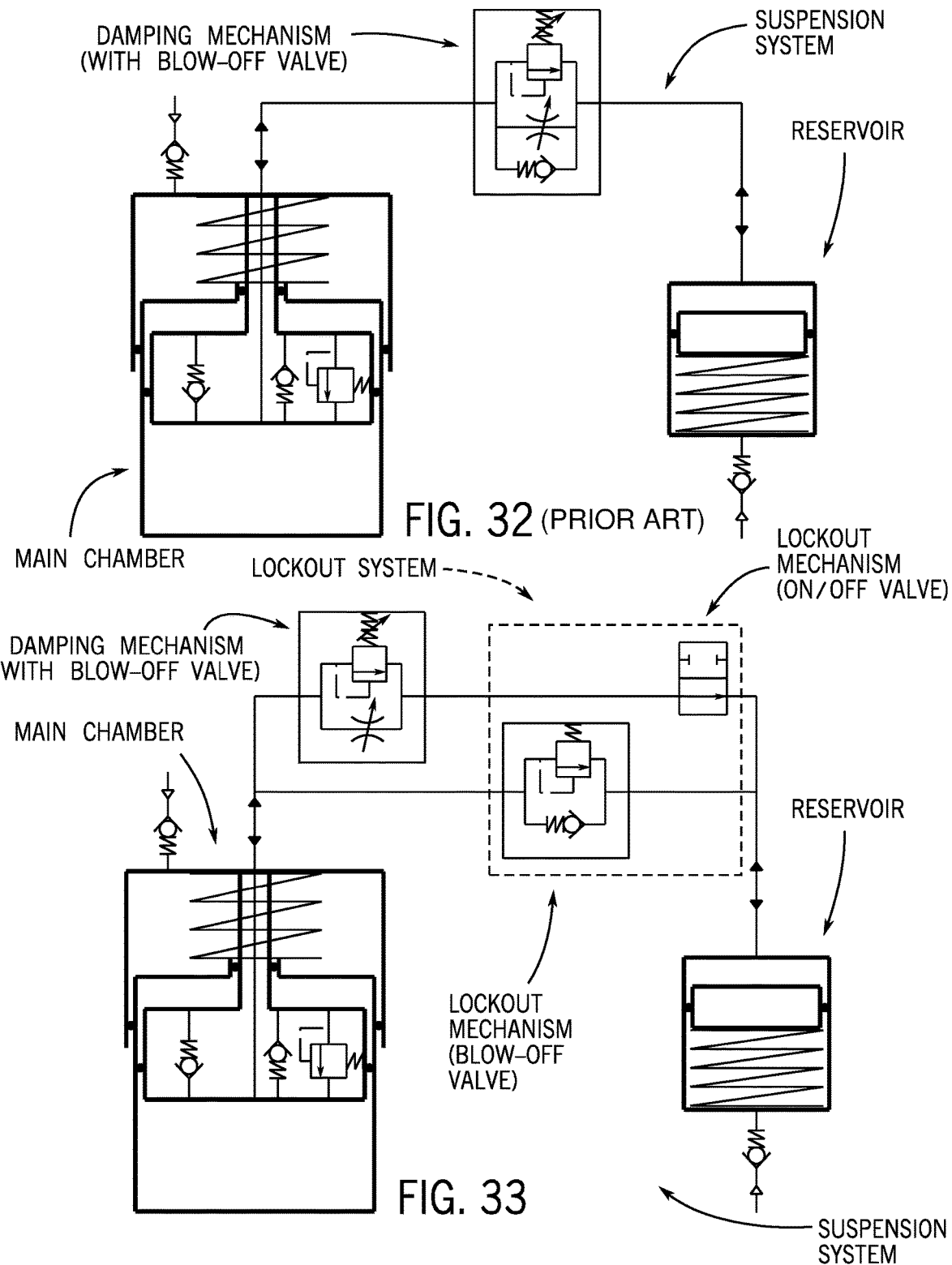
FIGS. 32 and 33 are schematic flow circuit diagrams of a suspension assembly for a bicycle according to an exemplary embodiment.

According to an exemplary embodiment as shown schematically in FIGS. 2, 3 and 33, a suspension assembly configured to use a volume of fluid in a fluid circuit for damping comprising a damping mechanism may comprise a lockout mechanism independent of the damping mechanism configured to prevent damping by the damping mechanism and an actuator for the lockout mechanism. See also FIGS. 17-18 and 30-31. The lockout mechanism may comprise a valve. See e.g. FIGS. 4, 4A-4B, 6 and 33. The suspension assembly may comprise a reservoir chamber for fluid in the fluid circuit. See e.g. FIGS. 2, 3, 8, 9 and 33. The lockout mechanism may be configured to provide a lockout setting. See e.g. FIG. 34. The lockout setting may be actuated by the actuator of the lockout mechanism. See e.g. FIGS. 2, 3, 4, 4A-4B, 17-18 and 33. The damping mechanism may be configured to provide a damping setting; the lockout setting may be independent of the damping setting; the damping mechanism may comprise a low speed damping arrangement; the damping mechanism may comprise a high speed damping arrangement; the damping mechanism may comprise a high speed damping arrangement and a low speed damping arrangement. See e.g. FIGS. 33-34.

According to an exemplary embodiment as shown schematically in FIGS. 1, 2 and 3, the suspension assembly may comprise a shock assembly comprising the damping mechanism and the lockout mechanism. Compare FIGS. 11, 14, 17, 21 and 24 (suspension system operation/fluid flow with damping mechanism in operation and with lockout system/mechanism not actuated) with FIGS. 18, 30, 31 (suspension system operation/fluid flow with lockout system/mechanism actuated and with damping mechanism not in operation). See also FIG. 33 (fluid circuit with damping mechanism and lockout system/mechanism) and FIG. 34 (schematic diagram of operation/performance with lockout/blow-off at point PL and operation/performance with damping system at/below point P).

According to an exemplary embodiment as shown schematically in FIGS. 1 and 33, The actuator for the lockout mechanism may be on the shock assembly; the actuator may be remote from the lockout mechanism (e.g. remote actuator RA). See also FIGS. 2-3. The suspension assembly may be configured for a bicycle comprising a handlebar; the actuator for the lockout mechanism may be on the handlebar. See e.g. FIG. 1 (remote actuator RA). The actuator may comprise a lever; the actuator may comprise a toggle switch. See e.g. FIGS. 33-34. The actuator may comprise an on-off switch for the lockout setting to actuate the lockout mechanism through an adjuster shaft providing a passage for flow of fluid when the actuator is off and an obstruction to flow of fluid when the actuator is on to actuate the lockout mechanism. See e.g. FIGS. 4, 4A-4B and 17-18. The actuator for the lockout mechanism may be configured to be adjusted without a tool; the lockout mechanism may be configured to be actuated without a tool. The lockout mechanism may be configured to be actuated by an operator of the bicycle.

According to an exemplary embodiment as shown schematically in FIGS. 2-3, 4, 4A-4B and 33, the lockout mechanism may comprise a flow control element to prevent flow of fluid from the fluid circuit into the reservoir chamber when the lockout mechanism is actuated. See FIGS. 4, 4A-4B, 17-18, 33 and 34. The lockout mechanism may comprise a blow-off valve. See FIGS. 6, 30-31, 33 and 34. The high speed damping arrangement may comprise a blow-off valve; the blow-off valve for the lockout mechanism may be provided a threshold value to open; a blow-off valve for the high speed damping arrangement may be provided a threshold value to open. See FIGS. 33 and 34.

According to an exemplary embodiment as shown schematically in FIGS. 33-34, the threshold value of the lockout mechanism may comprise an input to open the blow-off valve of the lockout mechanism; the threshold value of the high speed damping arrangement may comprise an input to open the blow-off valve of the high speed damping arrangement; the threshold value of the lockout mechanism may comprise an input to open the blow-off valve of the lockout mechanism; the threshold value of the high speed damping arrangement may comprise an input to open the blow-off valve of the high speed damping arrangement; and the threshold value of the lockout mechanism may be larger than the threshold value of the high speed damping arrangement. See e.g. FIGS. 30-31 and 33-34. When the lockout mechanism is off an input at the threshold value of the high speed damping system will open the blow-off valve of the high-speed damping system; when the lockout mechanism is on an input at the threshold value of the lockout mechanism will open the blow-off valve of the lockout mechanism. The threshold value of the high speed damping arrangement may be adjustable. According to an exemplary embodiment as shown schematically in FIGS. 33-34, the threshold value of the lockout mechanism may comprise a separate value from the threshold value of the high speed damping arrangement; actuation of the lockout mechanism may be independent of the actuation of the high speed damping arrangement.

According to an exemplary embodiment as shown schematically in FIGS. 2, 3, 4, 4A-4B, 6, 8A-8B, the lockout mechanism may comprise a flow control element; the flow control element may comprise a valve; the valve may comprise a shim stack. The high speed damping arrangement may comprise an adjuster. The low speed damping mechanism may comprise an adjuster; the adjuster may comprise a needle adjuster. See e.g. FIGS. 12, 13 and 14.

According to an exemplary embodiment as shown schematically in FIGS. 33 and 34, the suspension assembly may comprise a flow path for fluid through the lockout mechanism into the reservoir chamber separate from a flow path for fluid through the damping mechanism into the reservoir chamber. See also FIGS. 17-18 and 30-31.

According to an exemplary embodiment as shown schematically in FIGS. 33-34, the lockout mechanism may be configured to be actuated without adjustment of the damping mechanism; the lockout mechanism may be configured to be turned on and turned off without modification of the damping setting of the damping mechanism. The lockout mechanism may be configured to prevent flow of fluid into the reservoir chamber at the lockout setting; the lockout mechanism may comprise a valve configured to allow flow of fluid into the reservoir chamber at the lockout setting; the lockout mechanism may comprise a valve configured to allow flow of fluid into the reservoir chamber at the lockout setting when the fluid reaches a specified pressure. See e.g. FIGS. 6, 30-31 and 33-34. The valve of the lockout mechanism may provide a threshold value to allow flow of fluid into the reservoir chamber at the lockout setting; the lockout mechanism may comprise a blow-off valve configured with a threshold value to facilitate flow into the reservoir chamber; when the lockout mechanism is on fluid cannot enter a flow path for fluid through the damping mechanism. See e.g. FIGS. 17-18, 30-31 and 33-34.

According to an exemplary embodiment as shown schematically in FIGS. 2-3, 4, 4A-4B, 6, 8-9, 17-18, 30-31 and 33-34, the suspension assembly comprising a fluid circuit for a fluid configured to provide damping for a bicycle may comprise a damping mechanism configured to provide a damping setting for damping and a lockout mechanism configured to provide a lockout setting to prevent flow of the fluid through the damping mechanism and an actuator to actuate the lockout mechanism; the lockout mechanism may be configured to provide the lockout setting when on and to permit damping at the damping setting by the damping mechanism when off. The lockout mechanism may be configured to provide a lockout setting to lock out damping by the damping mechanism. See e.g. FIGS. 6, 30-31 and 33-34. The suspension assembly may comprise a reservoir chamber for flow of fluid in the fluid circuit. See e.g. FIGS. 2, 3 and 33. The damping mechanism may be inoperative when the lockout mechanism may be turned on to provide the lockout setting without damping; the damping mechanism may be operative to provide damping at the damping setting when the lockout mechanism may be turned off. See FIG. 34. The damping mechanism may comprise a low speed damping arrangement; the damping mechanism may comprise a high speed damping arrangement. See e.g. FIG. 33. The damping mechanism may comprise a high speed damping arrangement and a low speed damping arrangement. See e.g. FIGS. 32 and 33.

The suspension assembly may comprise a shock assembly comprising the damping mechanism and the lockout mechanism. See e.g. FIGS. 1 and 2-3. The actuator for the lockout mechanism may be on the shock assembly; the actuator for the lockout mechanism may be remote from the shock assembly. See e.g. FIGS. 1, 2-3 and 17-18. The actuator may comprise a lever; the actuator may comprise a toggle switch. See e.g. FIGS. 2-3 and 33. The actuator for the lockout mechanism may be configured to be adjusted without a tool. The lockout mechanism may comprise a flow control element; the flow control element may comprise a valve; the flow control element may comprise at least one of (1) an adjuster shaft or (2) an adjuster shaft configured to be rotated from an open position to provide a passage for flow of fluid and an closed position to provide an obstruction to flow of fluid and/or (3) a blow-off valve or (4) a blow-off valve comprising a shim stack. See e.g. FIGS. 2-3, 4, 4A-4B, 6, 17-18, 30-31 and 33-34. The high speed damping arrangement may comprise a blow-off valve. See FIG. 33. The blow-off valve for the lockout mechanism may be provided a threshold value; a blow-off valve for the damping mechanism may be provided a threshold value; the threshold value of the lockout mechanism may comprise an input to open the blow-off valve of the lockout mechanism; the threshold value of the high speed damping arrangement may comprise an input to open the blow-off valve of the damping mechanism; the threshold value of the lockout mechanism may comprise an input to open the blow-off valve of the lockout mechanism; the threshold value of the damping mechanism may comprise an input to open the blow-off valve of the damping mechanism; and the threshold value of the lockout mechanism may be larger than the threshold value of the damping mechanism; the threshold value of the lockout mechanism may comprise a separate value from the threshold value of the damping mechanism. See FIG. 34. The threshold value of the damping mechanism may be adjustable; actuation of the lockout mechanism may be independent of adjustment of the damping mechanism. See e.g. FIGS. 17-18, 30-31 and 33-34. The damping mechanism may comprise a low speed damping system the damping mechanism may comprise a high speed damping system. The damping mechanism may comprise an adjustable low speed damping system; the damping mechanism may comprise an adjustable high speed damping system (e.g. with pre-load shims, etc.). See FIGS. 32 and 33-34.

According to an exemplary embodiment as shown schematically in FIGS. 2-3, the suspension system comprising a fluid circuit for a fluid configured to provide damping for a bicycle comprising a damping mechanism configured to provide a damping setting for damping and a lockout mechanism configured to provide a lockout setting may comprise (a) a flow control element configured in the lockout setting to prevent flow of the fluid through the damping mechanism and (b) a flow control element configured to allow flow to a reservoir chamber of the fluid circuit if the pressure of the fluid may be greater than a threshold value. See also FIGS. 2-3, 4, 4A-4B, 6, 17-18, 30-31 and 33-34. The suspension system may comprise an actuator for the lockout mechanism configured to actuate the flow control element configured to prevent flow through the damping mechanism; the lockout mechanism may be configured to provide the lockout setting when on and to permit damping at the damping setting by the damping mechanism when off. The flow control element of the lockout mechanism configured to provide a lockout setting to lock out damping by the damping mechanism may comprise an adjuster shaft. See e.g. FIGS. 4, 4A-4B and 17-18. The damping mechanism may be inoperative when the lockout mechanism may be turned on to provide the lockout setting without damping; the damping mechanism may be operative to provide damping at the damping setting when the lockout mechanism may be turned off. See e.g. FIGS. 33-34. The damping mechanism may comprise a high speed damping arrangement and a low speed damping arrangement. The suspension system may comprise a shock assembly comprising the damping mechanism and the lockout mechanism. See e.g. FIGS. 1, 2-3 and 4. The actuator may comprise a toggle switch. See e.g. FIGS. 4, 4A-4B, 8-9 and 17-18. The flow control element configured to allow flow may comprise a valve; the valve may comprise a blow-off valve. The high speed damping arrangement may comprise a blow-off valve. The blow-off valve for the lockout mechanism may be provided the threshold value; a blow-off valve for the damping mechanism may be provided a threshold value. Compare FIG. 30 (lockout system/mechanism actuated with blow-off valve closed and no flow path established into reservoir) and FIG. 31 (lockout system/mechanism actuated with blow-off valve open and flow path established into reservoir upon high input/force). See also FIG. 34 (lockout system/mechanism performance shown by solid line with blow-off valve open at threshold value shown as PL).

The threshold value of the lockout mechanism may comprise an input to open the blow-off valve of the lockout mechanism; the threshold value of the high speed damping arrangement may comprise an input to open the blow-off valve of the damping mechanism; the threshold value of the lockout mechanism may comprise an input to open the blow-off valve of the lockout mechanism; the threshold value of the damping mechanism may comprise an input to open the blow-off valve of the damping mechanism; and the threshold value of the lockout mechanism may be larger than the threshold value of the damping mechanism; the threshold value of the lockout mechanism may comprise a separate value from the threshold value of the damping mechanism. See e.g. FIGS. 33-34. The threshold value of the damping mechanism may be adjustable; actuation of the lockout mechanism may be independent of adjustment of the damping mechanism; the damping mechanism may comprise an adjustable high speed damping system. See e.g. FIGS. 33-34.

According to an exemplary embodiment as shown schematically in FIGS. 1, 2, 3, 4, 4A-4B and 17-18, the adjuster shaft of the lockout system/mechanism is configured to be rotated by the actuator from an open position to provide a passage for flow of fluid to a closed position to provide an obstruction to flow of fluid. Compare FIG. 17 (lockout system/mechanism not actuated/"off" with flow path established through adjuster shaft 28 with passage 28a) and FIG. 18 (lockout system/mechanism actuated/"on" with passage/flow path obstructed at adjuster shaft 28 with wall 28b). The adjuster shaft provides a passage for flow of fluid when the actuator is off and an obstruction to flow of fluid when the actuator is on to actuate the lockout mechanism.

TABLE A

REFERENCE SYMBOL LIST

| REFERENCE SYMBOL | ELEMENT, PART, COMPONENT OR ASSEMBLY |
|---|---|
| BI | BICYCLE |
| FR | FRAME |
| FW | FRONT WHEEL |
| RW | REAR WHEEL |
| SP | SEAT POST |
| SE | SEAT |
| TB | STEERING TUBE |
| ST | STEM |
| HB | HANDLEBAR |
| GP | GRIP (HANDLEBAR) |
| FK | FRONT FORK ASSEMBLY |
| SH | SHOCK/ REAR SHOCK ABSORBER FOR SUSPENSION SYSTEM |
| BR | BRAKE SYSTEM |
| DS | DISC/ROTOR (BRAKE) |
| PD | PEDAL |
| RA | REMOTE ACTUATOR |

TABLE B

REFERENCE SYMBOL LIST

| REFERENCE SYMBOL | ELEMENT, PART, COMPONENT OR ASSEMBLY |
|---|---|
| 10 | Damper tube |
| 12 | Air can |
| 14 | Air piston |
| 16 | Spacer |
| 18 | Shaft assembly |
| 18a | Passage |
| 20 | Top cap assembly |
| 20a | First Passage |
| 20b | Second Passage |

TABLE B-continued

REFERENCE SYMBOL LIST

| REFERENCE SYMBOL | ELEMENT, PART, COMPONENT OR ASSEMBLY |
|---|---|
| 20c | Third Passage |
| 20d | Fourth Passage |
| 22 | End cap assembly |
| 24 | Internal floating piston |
| 26 | Reservoir tube |
| 28 | Lockout adjuster shaft |
| 28a | Passage |
| 28b | Wall |
| 30 | Lockout lever |
| 32 | Rebound adjuster |
| 34 | Rebound knob |
| 40 | Main shaft assembly |
| 42 | Main shaft |
| 44 | Shim |
| 46 | Plate |
| 48 | Shim |
| 50 | Piston |
| 52 | Piston ring |
| 54 | Clamp shim |
| 56 | Flow plate |
| 58 | Shim |
| 60 | Nut |
| 70 | Compression piston assembly |
| 72 | Low speed compression knob |
| 74 | retaining ring |
| 76 | washer |
| 78 | needle |
| 80 | Ball |
| 82 | Spring |
| 84 | High speed compression shaft |
| 84a | Passage |
| 86 | Body |
| 86a | Orifice |
| 88 | Spring |
| 90 | Shim |
| 92 | High speed compression piston |
| 92a | Passage |
| 94 | Shim |
| 96 | Nut |
| 100 | Lockout piston assembly |
| 102 | Piston seat |
| 102a | First Passage |
| 102b | Second Passage |
| 104 | Spring |
| 106 | Shim |
| 108 | Lockout piston |
| 108a | Passage |
| 110 | Shim |
| 112 | Retaining bolt |
| 112a | Passage |
| A | First Chamber |
| B | Second Chamber |
| C | Third Chamber |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A suspension assembly configured to use a volume of fluid in a fluid circuit for damping comprising a damping mechanism comprising:
   a top cap assembly;
   a lockout mechanism independent of the damping mechanism configured to prevent damping by the damping mechanism; and
   an actuator for the lockout mechanism;
   wherein the lockout mechanism is configured to provide a lockout setting and the lockout setting is actuated by the actuator of the lockout mechanism;
   wherein the damping mechanism is configured to provide a damping setting and the lockout setting is independent of the damping setting;
   wherein in the damping setting the fluid circuit comprises flow of fluid from a first chamber through the damping mechanism and through the lockout actuator to a reservoir chamber;
   wherein the damping mechanism comprises a compression piston within the top cap assembly;
   wherein the lockout mechanism is configured (a) to provide the lockout setting when on by providing a fluid circuit bypassing the compression piston of the damping mechanism and (b) to permit damping at the damping setting by the damping mechanism when off by providing a fluid circuit through the compression piston of the damping mechanism within the top cap assembly.

2. The suspension assembly of claim 1 further comprising a shock assembly comprising the damping mechanism and the lockout mechanism.

3. The suspension assembly of claim 2 wherein the actuator for the lockout mechanism is on the shock assembly.

4. The suspension assembly of claim 2 wherein the actuator is remote from the shock assembly.

5. The suspension assembly of claim 1 wherein the actuator comprises at least one of (a) a lever or (b) a switch.

6. The suspension assembly of claim 1 the fluid circuit through the compression piston of the damping mechanism within the top cap assembly comprises a passage between the damping mechanism and the lockout mechanism and a bypass passage connected to a blow-off valve.

7. The suspension assembly of claim 1 wherein the lockout mechanism comprises a flow control element to prevent flow of fluid from the fluid circuit into the reservoir chamber when the lockout mechanism is actuated.

8. The suspension assembly of claim 1 further comprising a flow path for fluid through the lockout mechanism into the reservoir chamber separate from a flow path for fluid bypassing the damping mechanism into the reservoir chamber.

9. The suspension assembly of claim 1 wherein the lockout mechanism is configured to be turned on and turned off without modification of the damping setting of the damping mechanism.

10. The suspension assembly of claim 1 wherein the lockout mechanism is configured to prevent flow of fluid into the reservoir chamber at the lockout setting.

11. The suspension assembly of claim 1 wherein when the lockout mechanism is on fluid cannot enter a flow path for fluid through the damping mechanism.

12. A suspension assembly comprising a fluid circuit for a fluid configured to provide damping for a bicycle comprising:
  a top cap assembly;
  a damping mechanism at least partially in the top cap assembly configured to provide a damping setting for damping;
  a lockout mechanism at least partially in the top cap assembly configured to provide a lockout setting to prevent flow of the fluid through the damping mechanism;
  an actuator to actuate the lockout mechanism;
  wherein the damping mechanism comprises a compression piston within the top cap assembly;
  wherein the lockout mechanism is configured (a) to provide the lockout setting when on by providing a fluid circuit bypassing the compression piston of the damping mechanism and (b) to permit damping at the damping setting by the damping mechanism when off by providing a fluid circuit through the compression piston of the damping mechanism within the top cap assembly.

13. The suspension assembly of claim 12 wherein the lockout mechanism is configured to provide a lockout setting to lock out damping by the damping mechanism; wherein the damping mechanism is inoperative when the lockout mechanism is turned on to provide the lockout setting without damping; wherein the damping mechanism is operative to provide damping at the damping setting when the lockout mechanism is turned off.

14. The suspension assembly of claim 12 further comprising a shock assembly comprising the damping mechanism and the lockout mechanism.

15. The suspension assembly of claim 14 wherein the actuator for the lockout mechanism is on the shock assembly.

16. The suspension assembly of claim 14 wherein the actuator for the lockout mechanism is remote from the shock assembly.

17. A suspension system comprising a fluid circuit for a fluid configured to provide damping for a bicycle comprising:
  a damping mechanism comprising a compression piston and configured to provide a damping setting for damping;
  a lockout mechanism configured to provide a lockout setting and comprising (a) a flow control element configured in the lockout setting to prevent flow of the fluid through the damping mechanism and (b) a flow control element comprising a blow-off valve configured to allow flow to a reservoir chamber of the fluid circuit if the pressure of the fluid is greater than a threshold value;
  an actuator for the lockout mechanism configured to actuate the flow control element configured to prevent flow through the damping mechanism;
  wherein the damping mechanism is configured to provide damping at the damping setting through the compression piston;
  wherein the lockout mechanism is configured (a) to provide the lockout setting when on by providing a fluid circuit through the blow-off valve bypassing the compression piston of the damping mechanism and (b) to permit damping at the damping setting by the damping mechanism when off by providing a fluid circuit through the compression piston of the damping mechanism;
  wherein the lockout mechanism is configured to operate independent of the damping mechanism so that the lockout mechanism may be turned on and turned off without modification of the damping setting of the damping mechanism.

18. The suspension system of claim 17 wherein the damping mechanism is inoperative when the lockout mechanism is turned on to provide the lockout setting without damping; wherein the damping mechanism is operative to provide damping at the damping setting when the lockout mechanism is turned off.

19. The suspension system of claim 17 further comprising a shock assembly comprising the damping mechanism and the lockout mechanism.

20. The suspension system of claim 17 wherein the actuator for the lockout mechanism is configured to be adjusted without a tool.

* * * * *